United States Patent
Asai et al.

(10) Patent No.: US 9,674,386 B2
(45) Date of Patent: Jun. 6, 2017

(54) IMAGE FORMING APPARATUS SELECTIVELY OPERABLE IN A PLURALITY OF MODES

(71) Applicant: BROTHER KOGYO KABUSHIKI KAISHA, Nagoya, Aichi (JP)

(72) Inventors: Yasuhiro Asai, Nagoya (JP); Hirotaka Asakura, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/068,695

(22) Filed: Mar. 14, 2016

(65) Prior Publication Data
US 2016/0277619 A1 Sep. 22, 2016

(30) Foreign Application Priority Data
Mar. 19, 2015 (JP) .................. 2015-055987

(51) Int. Cl.
| H04N 1/00 | (2006.01) |
| H04W 52/02 | (2009.01) |
| H04W 4/00 | (2009.01) |

(52) U.S. Cl.
CPC ..... H04N 1/00896 (2013.01); H04N 1/00244 (2013.01); H04N 1/00307 (2013.01); H04W 4/008 (2013.01); H04W 52/028 (2013.01); H04N 2201/006 (2013.01); H04N 2201/0072 (2013.01); H04N 2201/0094 (2013.01); Y02B 60/50 (2013.01)

(58) Field of Classification Search
USPC ...................................................... 358/1.13
See application file for complete search history.

(56) References Cited

U.S. PATENT DOCUMENTS

| 2007/0165262 A1* | 7/2007 | Watanabe | .......... G03G 15/5016 358/1.14 |
| 2012/0140278 A1* | 6/2012 | Sousa | ..................... G06F 3/121 358/1.15 |
| 2015/0173020 A1* | 6/2015 | Mikami | ............ H04W 52/0235 370/311 |

FOREIGN PATENT DOCUMENTS

| JP | 2006-095750 A | 4/2006 |
| JP | 2012-032953 A | 2/2012 |

* cited by examiner

*Primary Examiner* — Ngon Nguyen
(74) *Attorney, Agent, or Firm* — Scully, Scott, Murphy & Presser, PC

(57) ABSTRACT

In an image forming apparatus, a communication device is selectively operable in a communication device side normal mode and a sleep mode consuming less power than the communication device side normal mode. The controller is selectively operable in a controller side normal mode, a first sleep mode consuming less power than the controller side normal mode, and a second sleep mode consuming less power than the first sleep mode. The controller is configured to: transmit to the communication device a command instructing to transit to the sleep mode in response to transition to the second sleep mode; maintain the sleep mode regardless of return from the second sleep mode to the first sleep mode; and transmit to the communication device a command instructing to return from the sleep mode to the communication device side normal mode in response to return to the controller side normal mode.

12 Claims, 11 Drawing Sheets

IMAGE FORMING APPARATUS SELECTIVELY OPERABLE IN A PLURALITY OF MODES

CROSS REFERENCE TO RELATED APPLICATION

This application claims priority from Japanese Patent Application No. 2015-055987 filed Mar. 19, 2015. The entire content of the priority application is incorporated herein by reference.

TECHNICAL FIELD

The present disclosure relates to a power saving technology in an image forming apparatus provided with a communication function and a plurality of sleep modes.

BACKGROUND

There is conventionally known an image forming apparatus provided with two operation modes: a normal operation mode in which print processing is executed and a sleep mode (low power consumption mode) in which power is supplied only to a specific module such as a network interface, an operation unit, or the like so as to reduce power consumption more than in the normal operation mode (see, for example, Japanese Patent Application Publication No. 2006-95750). An image forming apparatus disclosed in the above-stated document has a wireless communication unit that communicates with a wireless tag. When the apparatus enters the sleep mode and needs not search for the wireless tag, it stops power supply to the wireless communication unit for power saving.

On the other hand, when receiving a print job through the network interface or when the operation unit is operated by a user, the image forming apparatus resumes the power supply to the wireless communication unit. That is, it is highly likely that authentication of the wireless tag by the user is performed when the print job is received or when the operation unit is operated, and, thus, the image forming apparatus activates the wireless communication unit to search for the wireless tag.

SUMMARY

In the above-stated image forming apparatus, by switching power supply to the wireless communication unit in accordance with the need of searching the wireless tag, power saving is achieved while maintaining usability. An image forming apparatus of such a type is sometimes required to satisfy various specifications in each of which a maximum power consumption value is defined and is thus required to achieve further power saving. As a measure for responding to such a requirement, it can be considered that a plurality of sleep modes are set to the image forming apparatus so as to perform switching of power supply in a plurality of stages. In this case, the image forming apparatus is required to switch operation of the wireless communication unit in response to the switching between the plurality of sleep modes in order also to maintain usability.

In view of the foregoing, it is an object of the disclosure to provide an image forming apparatus provided with a communication device that performs wireless communication and a plurality of sleep modes for reducing power consumption, which is capable of suitably switching priority between power saving and usability.

In order to attain the above and other objects, the one aspect provides an image forming apparatus that includes a communication device; and a controller. The communication device is configured to perform wireless communication. The communication device is selectively operable in a communication device side normal mode and a communication device side sleep mode consuming less power than the communication device side normal mode. The controller is selectively operable in a controller side normal mode, a controller side first sleep mode consuming less power than the controller side normal mode, and a controller side second sleep mode consuming less power than the controller side first sleep mode. The controller is configured to: transmit to the communication device a first command produced in response to transition to the controller side second sleep mode, the first command instructing the communication device to transit to the communication device side sleep mode; maintain the communication device side sleep mode regardless of return from the controller side second sleep mode to the controller side first sleep mode; and transmit to the communication device a second command produced in response to return to the controller side normal mode, the second command instructing the communication device to return from the communication device side sleep mode to the communication device side normal mode.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
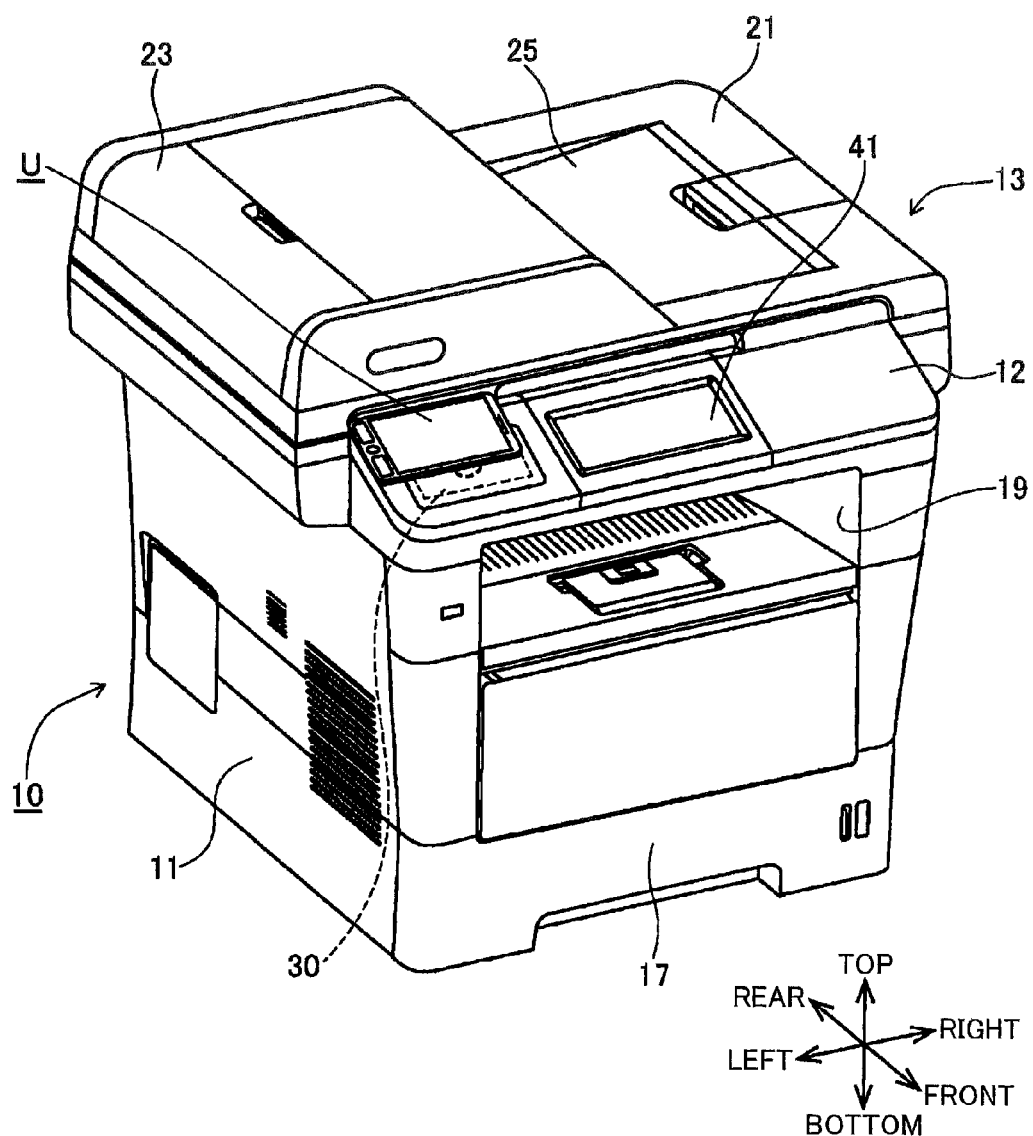
FIG. 1 is a perspective view of a multifunction peripheral according to an embodiment of the present disclosure.
Figure 2:
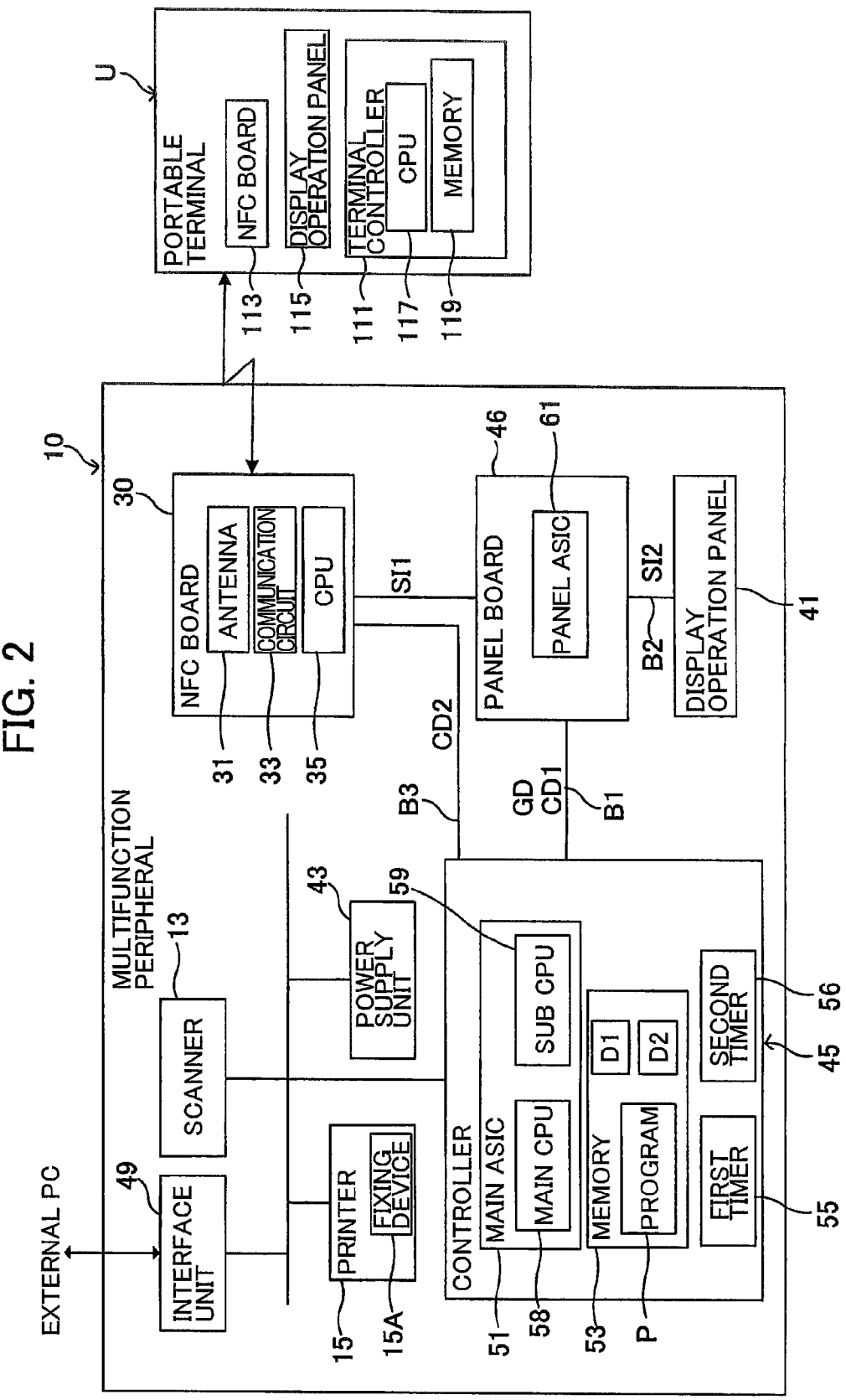
FIG. 2 is a block diagram illustrating an electrical configuration of the multifunction peripheral and that of a portable terminal.

Hereinafter, an embodiment of the present disclosure will be described with reference to the drawings. FIG. 1 is a perspective view of a multifunction peripheral 10 which is an example of an image forming apparatus according to the present disclosure. FIG. 2 is a block diagram illustrating an electrical configuration of the multifunction peripheral 10 and that of a portable terminal U. The multifunction peripheral 10 is provided with a communication function, a scan function, and a print function. The multifunction peripheral 10 has a substantially box-shaped casing body 11 and a flatbed type scanner 13 provided on an upper side of the casing body 11. The casing body 11 houses therein a printer 15. A supply tray 17 is removably inserted into a lower portion of the casing body 11. A sheet (paper sheet, OHP sheet, etc.) supplied from the supply tray 17 is conveyed to the printer 15 through a sheet conveying path (not illustrated). The sheet is then subjected to printing by the printer 15, and the resultant sheet is discharged to an in-body sheet discharge portion 19 provided at a center of the casing body 11.

The scanner 13 has a reading device (not illustrated) such as a CCD, a CIS, or the like, a platen glass (not illustrated), and a document cover 21. The document cover 21 is opened, a document is placed on the platen glass, and then the document cover 21 is closed. Then, the reading device is moved to a left-right direction of the multifunction peripheral 10 to thereby read an image of the document. An ADF (automatic document feeder) 23 is provided in the document cover 21 of the scanner 13, allowing documents placed on a document placing portion 25 to be fed one by one for reading.

On an upper surface wall 12 provided at a front side of the casing body 11, an NFC (Near Field Communication) board 30 and a display operation panel 41 are arranged side by side in the left-right direction. The NFC board 30 (example of a communication device) is incorporated at a left side of the upper surface wall 12. The display operation panel 41 is disposed at a substantial center of the upper surface wall 12. The display operation panel 41 has a configuration obtained by overlapping a resistive film type or electrostatic capacitance type touch panel and a liquid crystal display panel in a thickness direction thereof. A desired input operation can be achieved by depressing one of operation keys displayed on the touch panel.

The following describes an electrical configuration of the portable terminal U and that of the multifunction peripheral 10 with reference to FIG. 2.

The NFC board 30 communicates with the portable terminal U according to a Near Field Communication System (hereinafter, referred to as "NFC system") and has a loop antenna 31, a communication circuit 33, and a CPU 35. The communication of the NFC system (hereinafter, sometimes referred to as "NFC communication") is executed based on international standards of ISO/IEC21481 or ISO/IEC18092. The multifunction peripheral 10 can authenticate a user who wants to perform print processing through the NFC communication between the NFC board 30 and the portable terminal U.

The loop antenna 31 transmits/receives radio waves so as to communicate with a communication-partner device according to the NFC system. The communication circuit 33 performs signal processing for the radio waves transmitted/received by the loop antenna 31. The CPU 35 detects the radio waves flowing through the loop antenna 31 to thereby detect intensity of radio waves (receiving waves) received by the loop antenna 31 or radio waves (transmitting waves) transmitted from the loop antenna 31. The CPU 35 changes the intensity of the radio waves to be transmitted from the loop antenna 31 according to modes to be described later.

The portable terminal U is, e.g., a mobile phone (smartphone, etc.). The portable terminal U has a terminal controller 111, an NFC board 113, and a display operation panel 115. The terminal controller 111 has a central processing unit (hereinafter, referred to as "CPU") 117 and a memory 119. The memory 119 has a ROM, RAM, or the like. The ROM stores various programs such as a print application program that allows the multifunction peripheral 10 to execute print processing and a reading application program that allows the multifunction peripheral 10 to execute scan processing.

The CPU 117 controls components of the portable terminal U according to the program read from the ROM. The application program may be installed in the portable terminal U, for example, from a server provided by a vender of the multifunction peripheral 10 or from a medium shipped together with the multifunction peripheral 10. Alternatively, the application program may be preinstalled in the portable terminal U.

Like the NFC board 30 of the multifunction peripheral 10, the NFC board 113 includes a loop antenna, a communication circuit, and a CPU (all of which are not illustrated). The NFC board 113 is mounted on a rear surface of the portable terminal U (surface opposite to a front surface on which the display operation panel 115 is provided). The NFC board 113 functions as an NFC interface for performing the NFC communication.

The display operation panel 115 has a configuration obtained by overlapping a resistive film type or electrostatic capacitance type touch panel and a liquid crystal display panel in a thickness direction thereof. A desired input operation can be achieved by depressing one of operation keys displayed on the touch panel. The display operation panel 115 can display various setting screens, operating states of the multifunction peripheral 10 and the like.

The multifunction peripheral 10 includes a power supply unit 43, a controller 45, a panel board 46, and an interface unit 49, in addition to the scanner 13, the printer 15, the NFC board 30, and the display operation panel 41. The printer 15 prints an image on a sheet according to a print job under control of the controller 45. An electro-photographic printer and an ink-jet printer may be used as the printer 15. In the present embodiment, the electro-photographic printer is adopted as the printer 15, in which a fixing device 15A having a heater is provided and a developer image transferred onto the sheet is fixed by heat of the heater.

The power supply unit 43 functions as a power supply for the multifunction peripheral 10 and supplies power to the scanner 13, the printer 15, and the interface unit 49. For example, an operating voltage of the printer 15 is 24 V, and power corresponding to the operating voltage is supplied to the printer 15 from the power supply unit 43.

The controller 45 has a main ASIC (application specific integrated circuit) 51, a memory 53, a first timer 55, and a second timer 56. The main ASIC 51 totally controls various processing to be performed in the multifunction peripheral 10 including the print processing of the printer 15 and has a main CPU 58 and a sub CPU 59. The sub CPU 59 is a processing circuit with less consumption power and less through-put than those of the main CPU 58.

The memory 53 is constituted by a ROM, a RAM, and the like. The memory 53 stores a program P executed by the main ASIC 51. The main ASIC 51 reads out program P stored in the memory 53 and executes various processing. By executing the processing according to the program P, the main ASIC 51 controls the printer 15 and the scanner 13 to execute the print processing and image reading processing, executes communication processing using the NFC board 30 to communicate with the portable terminal U, and executes mode change processing to be described later. The multifunction peripheral 10 is connected to a network through the interface unit 49 and can thus receive a print job from an external PC.

The panel board 46 is connected to the NFC board 30, the display operation panel 41, and the controller 45, and has a panel ASIC 61. The panel board 46 is connected to the controller 45 through a serial bus B1. The panel ASIC 61 processes a control signal CD1 received from the controller 45 through the serial bus B1. The serial communication in the serial bus B1 that transfers the control signal CD1 is made by, e.g., UART (universal asynchronous receiver-transmitter) communication. Further, the panel ASIC 61 receives display image data GD created by the main ASIC 51 of the controller 45 through the serial bus B1. The panel ASIC 61 is connected to the display operation panel 41 through a parallel bus B2 and displays the display image data GD received from the controller 45 on the display operation panel 41. The serial communication in the serial bus B1 that transfers the display image data GD is communication conforming to LVDS (low voltage differential signaling) standards.

The controller 45 and the NFC board 30 are connected by a serial bus B3. For example, I2C (I square C) bus may be used as the serial bus B3. The controller 45 and the NFC board 30 exchange a control command CD2 through the serial bus B3.

The first and second timers 55 and 56 of the controller 45 each measure time or reset the measured time under control of the main ASIC 51. The first and second timers 55 and 56 may each be implemented by a circuit (hardware) that receives power supply to measure time or software realized by executing a program on the main ASIC 51.

The multifunction peripheral 10 has, as operation modes, a normal mode (example of controller side normal mode), a sleep mode (example of controller side first sleep mode), and a deep sleep mode (example of controller side second sleep mode). The normal mode is a mode in which the multifunction peripheral 10 is in a state where it can execute the print processing immediately in response to a print instruction or a state where it is executing the print processing. Thus, in the normal mode, the controller 45 controls the power supply unit 43 to maintain a temperature of the heater of the fixing device 15A at a fixing temperature at which the developer image can be fixed or at a standby temperature slight lower than the fixing temperature.

Further, the main ASIC 51 of the controller 45 reduces power consumption of the multifunction peripheral 10 according to a use state of the multifunction peripheral 10 or measured time of the first and second timers 55 and 56. More specifically, the sleep mode and the deep sleep mode are each a power saving mode for reducing a total amount of power supply to the components such as the display operation panel 41 or the power supply unit 43 more than in the normal mode, and the controller 45 performs control of switching between the sleep mode and the deep sleep mode.

The sleep mode is a mode that saves power by, e.g., stopping power supply to the heater of the fixing device 15A and turning off a backlight of the display panel of the display operation panel 41 to put the display panel in a non-display state. However, in the sleep mode, a function of the touch panel of the display operation panel 41 is enabled in order to promptly respond to a user's input operation. The main ASIC 51 executes transition from the normal mode to the sleep mode according to the measured time of the first timer 55 and the like. In the present embodiment, for example, when five minutes (example of a predetermined period of time) have elapsed from the start of the time measurement by the first timer 55 in the normal mode, the main ASIC 51 executes transition to the sleep mode.

On the other hand, the deep sleep mode is a mode that saves power by switching a processing entity from the main CPU 58 to the sub CPU 59 with less power consumption than the main CPU 58. Further, the deep sleep mode saves power by reducing a drive voltage to be supplied from the power supply unit 43 to the printer 15 from 24 V to 6 V. Also in the deep sleep mode, the backlight of the display panel of the display operation panel 41 is turned off to put the display panel in a non-display state, and the function of the touch panel of the display operation panel 41 is enabled in order to promptly respond to a user's input operation. The main ASIC 51 executes transition from the sleep mode to the deep sleep mode according to the measured time of the second timer 56. In the present embodiment, for example, when five minutes have elapsed from the start of the time measurement by the second timer 56 in the sleep mode, the main ASIC 51 executes transition to the deep sleep mode.

The NFC board 30 according to the present embodiment has, as an operation mode thereof, a normal mode (example of a communication device side normal mode) and a snooze mode (example of a communication device side sleep mode). The normal mode is a mode in which when, for example, the portable terminal U is brought close to the NFC board 30 in a state where the CPU 35 is activated, the NFC communication can be immediately performed for authentication. The snooze mode is a mode that saves power by halting the CPU 35.

The NFC board 30 transmits, from the loop antenna 31, a radio wave (radio wave for polling) for inquiry at predetermined time intervals so as to search for whether there is any external device, such as the portable terminal U, with which the NFC communication is performed at a portion above the upper surface wall 12 (see FIG. 1) of the casing body 11 in the vicinity of the NFC board 30. The NFC board 30 of the present embodiment executes, in the snooze mode, search of the external device by transmitting the polling radio waves with the CPU 35 halted. At this time, intensity of the radio waves to be transmitted is reduced more than that in the normal mode for power saving. When detecting the external device by the search, the NFC board 30 notifies the main ASIC 51 of the corresponding information (interruption request signal SI1). The main ASIC 51 receives the notification from the NFC board 30 through the panel board 46 and cancels the snooze mode of the NFC board 30 upon receipt thereof. Thus, in the snooze mode, the NFC board 30 of the present embodiment is configured to be able to transmit the interruption request signal SI1 even in a state where the CPU 35 is halted.

Further, as described later, the controller 45 of the present embodiment makes the NFC board 30 transit to the snooze mode with transition of the operation mode of the multifunction peripheral 10 to the deep sleep mode. Further, the controller 45 makes the NFC board 30 return from the snooze mode to the normal mode when the multifunction peripheral 10 returns from the deep sleep mode to the normal mode or from the sleep mode to the normal mode.

The following describes processing in each of the above-described modes executed by the main ASIC 51 of the controller 45 with reference to FIGS. 3 to 6. The flowcharts of FIGS. 3 to 6 each illustrate processing executed by the main CPU 58 which is activated when a power switch of the multifunction peripheral 10 is ON or activated after cancellation of the deep sleep mode.

The main CPU 58 halts the sub CPU 59 in step (hereinafter, sometimes abbreviated as "S") 11 in FIG. 3. The sub CPU 59 is activated with power-ON of the power supply or with transition to the deep sleep mode. However, processing in the normal mode and the sleep mode are mainly processed by the main CPU 58, so that the sub CPU 59 needs to be halted.

Then, the multifunction peripheral 10 transits to the sleep mode (S13). That is, the multifunction peripheral 10 activates the main CPU 58 of the controller 45 to put the display panel of the display operation panel 41 in a display state. The main CPU 58 needs to measure time in the subsequent processing so as to determine whether to perform the mode transition and therefore clears the first and second timers 55 and 56 (S15).

Next, the main CPU 58 determines whether processing start is triggered by power-ON of the power switch or by return from the deep sleep mode (S17). The main CPU 58 determines that the processing start is triggered by power-ON of the power switch (S17: YES) if any one of five conditions (e.g., receiving a print job from an external PC through the interface unit 49), to be described later, for determining the return from the deep sleep mode is not satisfied. Then, the main CPU 58 transmits the control signal CD1 for canceling the snooze mode of the NFC board 30 to the panel ASIC 61 to make the NFC board 30 enter the normal mode. In this state, the main CPU 58 executes initialization of the CPU 35 of the NFC board 30 (S19). Generally, in a case where a board that executes near field wireless communication according to the NFC system has the normal mode and the snooze mode for power saving, when initialization of a chip is executed in the normal mode, time taken for the processing is reduced more than in that in the power saving mode. Therefore, the CPU 58 executes the initialization after making the NFC board 30 enter the normal mode so as to reduce time required for the initialization at the time of activation.

The panel ASIC 61 can set or cancel the snooze mode by changing a level of a signal to be sent out to an I/O terminal connected to the NFC board 30. Thus, for example, when receiving the control signal CD1 for canceling the snooze mode, the panel ASIC 61 changes the signal level to be sent out to the I/O terminal from a high level to a low level. In addition to the above, the NFC board 30 of the present embodiment is configured not to execute transition to/return from a predetermined mode until it has received the control command CD2 from the controller 45 through the serial bus B3. That is, the NFC board 30 does not return from the snooze mode to the normal mode until it detects a change in the signal level and receives the control command CD2.

Then, the main CPU 58 generates the display image data GD to be displayed on the display panel of the display operation panel 41 for return to the normal mode (S21). Unlike the panel board 46, the main CPU 58 has the memory 53 as a storage device and executes image processing while storing temporary data in the RAM of the memory 53. The main CPU 58 transmits the generated display image data GD to the panel ASIC 61 (S23). Further, the main CPU 58 transmits, to the panel ASIC 61, an activation signal (control signal CD1) for changing the state of the display operation panel 41 from the non-display state to the display state (S23). The panel ASIC 61 puts the display operation panel 41 into the display state and makes the display operation panel 41 display the display image data GD received from the main CPU 58 on the display panel. The display panel thus enters the display state and, then, the multifunction peripheral 10 enters the normal mode (S25). The main CPU 58 executes processing of S53 and subsequent steps of FIG. 4.

On the other hand, a case where the processing start is not triggered by power-ON of the power switch (S17: NO), that is, a case where the processing start is triggered by return from the deep sleep mode corresponds to a case where the multifunction peripheral 10 returns from the deep sleep mode to the sleep mode, or from the deep sleep mode to the normal mode. In the deep sleep mode or the sleep mode, the display panel of the display operation panel 41 is in the non-display state. In other words, when the display panel needs to be put in the display state, the multifunction peripheral 10 transits to the normal mode. Thus, the main CPU 58 determines whether the return from the deep sleep mode is caused due to execution of a function that requires the display panel to be in the display state (S27). When an affirmative determination is obtained in S27, the main CPU 58 performs display processing and makes the multifunction peripheral 10 transit to the normal mode.

In the present embodiment, conditions for the multifunction peripheral 10 to return from the deep sleep mode to the normal mode or from the deep sleep mode to the sleep mode include the following five cases: (1) when a print job is received from an external PC through the interface unit 49; (2) when a user's operation made to the display operation panel 41 is detected; (3) when an approach of the portable terminal U is detected by the polling, and interruption request signal SI1 (see FIG. 2) is received from the NFC board 30; (4) when a processing load on the sub CPU 59 exceeds a fixed value (threshold value L); and (5) when a communication amount in the interface unit 49 exceeds a fixed amount (predetermined amount D). Three cases ((1) when a print job is received, (2) when a user's operation is detected, and (3) when the interruption request signal SI1 is received) of the above five cases correspond to a case where a request to put the display panel of the display operation panel 41 in the display state (hereinafter, referred to as "panel display request") is detected, that is, a case where the multifunction peripheral 10 returns to the normal mode. Thus, when determining that any one of the above three panel display requests has been detected (S27: YES), the main CPU 58 executes, before making the multifunction peripheral 10 return to the normal mode, preprocessing (processing of S29 and subsequent steps) corresponding to the received panel display request as well as the display processing for the display panel.

When receiving the interruption request signal SI1 from the NFC board 30 as the panel display request, preprocessing different from that when any one of the other two panel display requests is received needs to be performed. Thus, when determining that the panel display request has been detected (S27: YES), the main CPU 58 determines whether or not the interruption request signal SD is received from the panel ASIC 61 (S29). On the other hand, a case where the main CPU 58 has not detected the panel display request (S27: NO) corresponds to a case where the multifunction peripheral 10 returns from the deep sleep mode to the sleep mode. Thus, when determining that the panel display request has not been detected (S27: NO), the main CPU 58 starts executing processing corresponding to the sleep mode, that is, processing of step S83 and subsequent steps of FIG. 5.

A case where the interruption request signal SD is transmitted from the NFC board 30 to the main CPU 58 corresponds to a case where the multifunction peripheral 10 is in the deep sleep mode and where a user puts the portable terminal U over the NFC board 30 in a state where the NFC board 30 is in the snooze mode. Thus, when determining in S29 that the interruption request signal SD has been received (S29: YES), the main CPU 58 transmits, to the panel ASIC 61, the control signal CD1 for canceling the snooze mode of the NFC board 30 (S31). When receiving the control signal CD1 for canceling the snooze mode, for example, the panel ASIC 61 changes the signal level to be sent out to the I/O terminal connected to the NFC board 30 from a high level to a low level. Further, the main CPU 58 transmits the control command CD2 to the NFC board 30 through the serial bus B3 to make the NFC board 30 return to the normal mode (S32).

Then, the main CPU 58 performs the NFC communication between the NFC board 30 and the portable terminal U with the NFC board 30 operated in the normal mode (S33). The main CPU 58 performs authentication of the portable terminal U. For return to the normal mode, the main CPU 58 generates the display image data GD to be displayed on the display operation panel 41 (S35) and transmits the generated display image data GD to the panel ASIC 61 (S37). Further, the main CPU 58 transmits, to the panel ASIC 61, the activation signal (control signal CD1) for putting the display operation panel 41 into the display state (S37). The display panel thus enters the display state and, then, the multifunction peripheral 10 enters the normal mode (S39).

As described above, the main CPU 58 of the present embodiment executes first the communication processing (S31, S32, and S33) for making the NFC board 30 execute the NFC communication and then executes display processing (S35 and S37) for making the display operation panel 41 display the display image data GD. That is, the main CPU 58 executes the communication processing in priority to the display processing. This is because the communication processing includes the NFC communication and user authentication and thus imposes a larger processing load than the display processing, which may result in longer processing time. Thus, the main CPU 58 preferentially executes the communication processing to prevent a delay from occurring in processing such as the user authentication, thereby improving usability.

On the other hand, a case where the interruption request signal SI1 is not received (S29: NO) corresponds to a case where the interface unit 49 receives a print job or where a user's operation made to the display operation panel 41 is detected in a state where the multifunction peripheral 10 is in the deep sleep mode and where the NFC board 30 is in the snooze mode. In this case, the main CPU 58 executes processing of S41 and subsequent steps. For return to the normal mode, the main CPU 58 generates the display image data GD to be displayed on the display operation panel 41 (S41) and transmits the generated display image data GD and activation signal (control signal CD1) to the panel ASIC 61 (S43). The display panel thus enters the display state and, then, the multifunction peripheral 10 enters the normal mode (S45).

Then, the main CPU 58 transmits, to the panel ASIC 61, the control signal CD1 for canceling the snooze mode of the NFC board 30 (S47). At this time, the control signal CD1 for canceling the snooze mode and the control signal CD1 for displaying the display panel (S43) may conflict with each other during transmission through the serial bus B1 (see FIG. 2). Thus, when it cannot be detected that the NFC board 30 returns to the normal mode from the snooze mode, the main CPU 58 preferably transmits the control signal CD1 for canceling the snooze mode once again. Further, the main CPU 58 transmits the control command CD2 to the NFC board 30 through the serial bus B3 to make the NFC board 30 transit to the normal mode (S49).

Unlike the processing of S31 and subsequent steps executed after the receipt of the interruption request signal SI1, when receiving a print job or detecting a panel operation, the main CPU 58 of the present embodiment executes first the display processing (S41 and S43) to allow the display operation panel 41 to display the display image data GD and then the processing (S47 and S49) to cancel the snooze mode of the NFC board 30. That is, the main CPU 58 executes the display processing in priority to the snooze mode cancellation processing. This is because a possibility of immediately executing the NFC communication (authentication, etc.) is lower than in the processing of S31 and subsequent steps. As a result, for example, when a user's operation is made to the display operation panel 41 in the deep sleep mode, the priority of the processing for making the NFC board 30 return to the normal mode is lowered to prevent a delay from occurring in the display processing. This allows the user to be promptly informed that the display of the display operation panel 41 has been enabled.

Figure 3:
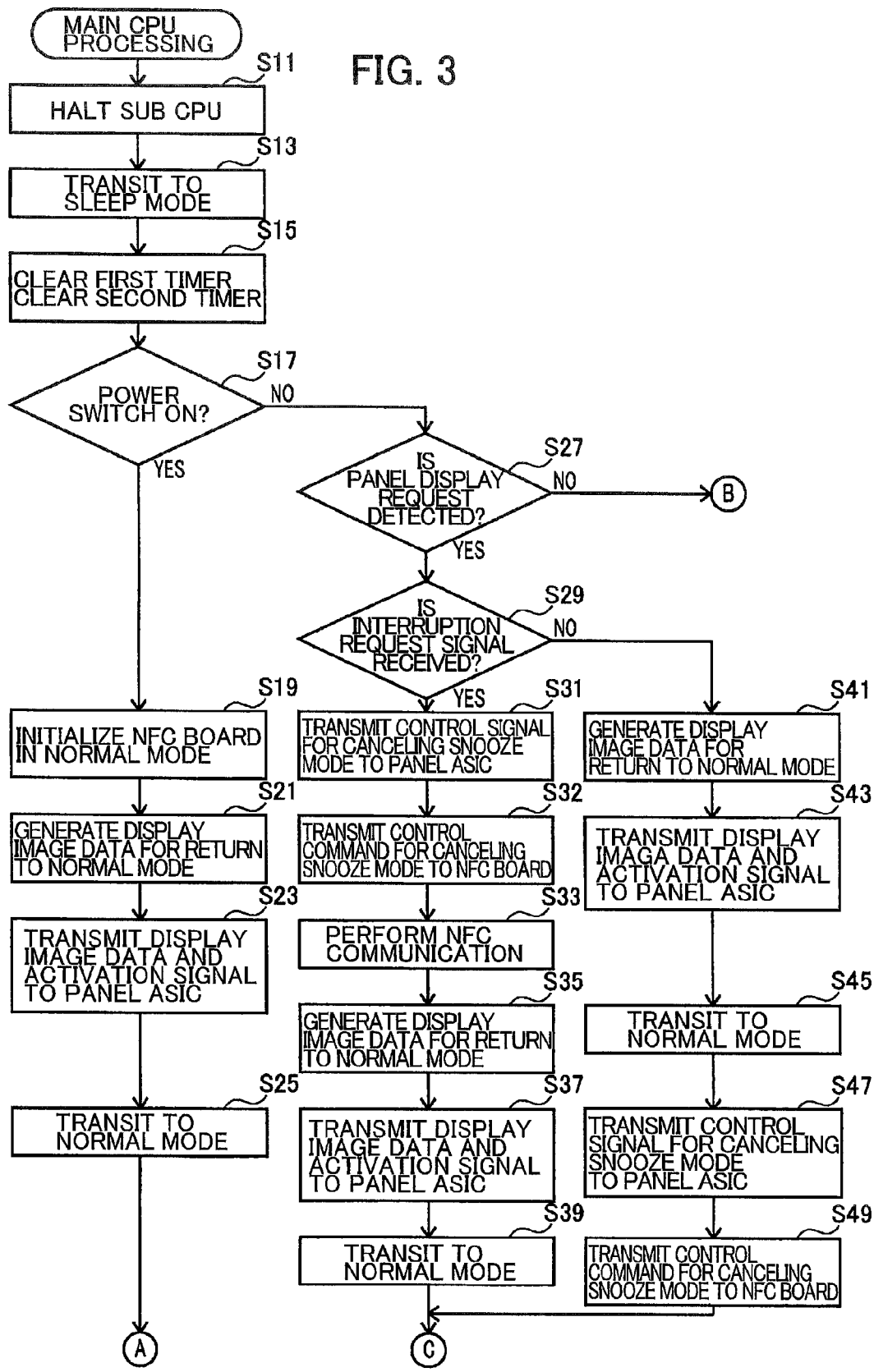
FIG. 3 is a flowchart illustrating steps in processing executed by a main CPU in a normal mode and a sleep mode.
Figure 4:
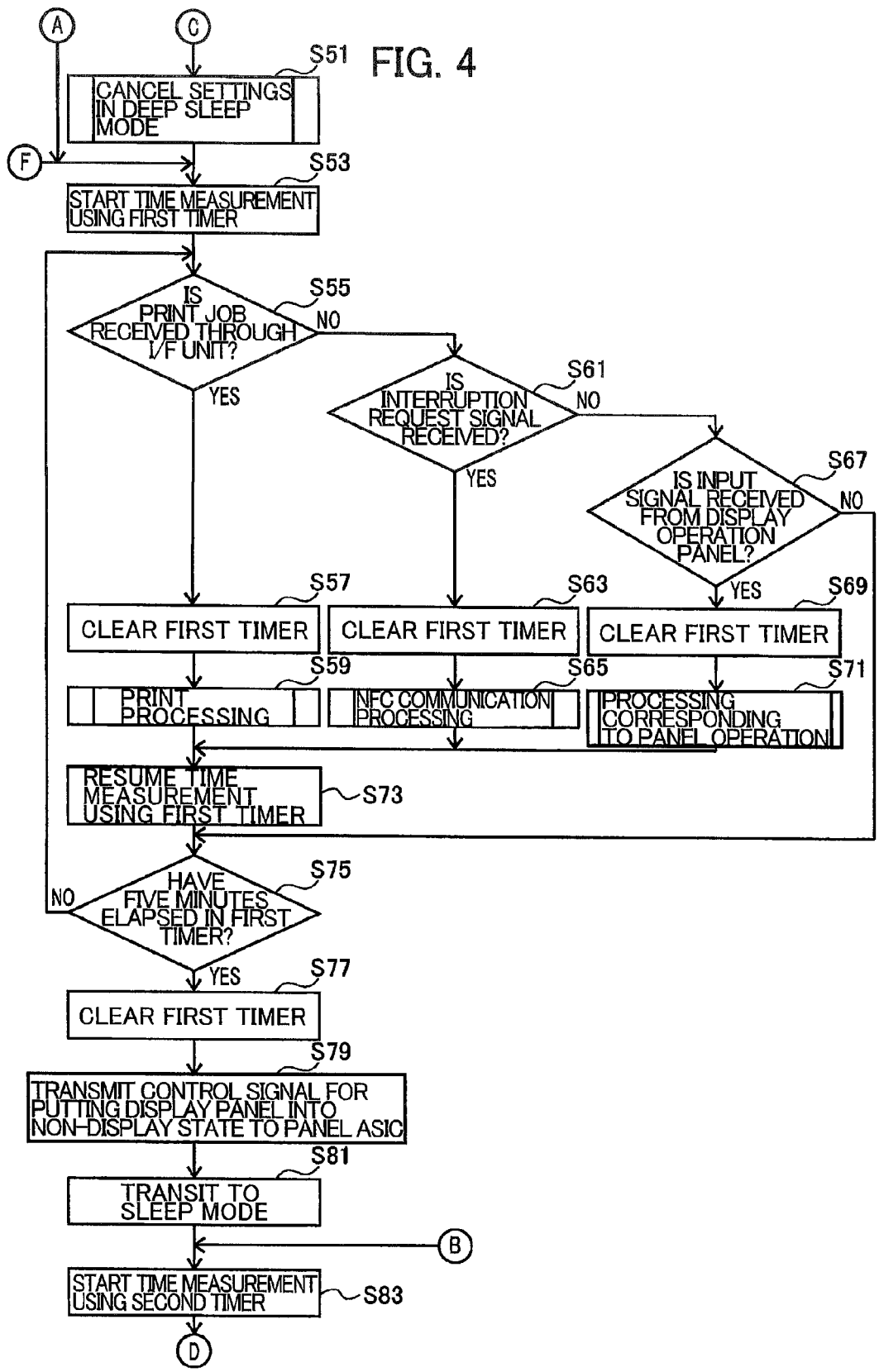
FIG. 4 is a flowchart illustrating steps in processing executed by the main CPU in the normal mode and the sleep mode.

Next, as illustrated in FIG. 4, the main CPU 58 executes the processing of S39 or S49 and then cancels various settings in the deep sleep mode (S51). Specifically, in the deep sleep mode, the drive voltage to be supplied from the power supply unit 43 to the printer 15 is reduced from 24 V to 6 V to put the heater of the fixing device 15A of the printer 15 into an off state. Thus, the main CPU 58 increases an output voltage of the power supply unit 43 to 24 V to put the heater of the fixing device 15A into an ON state. Further, the main CPU 58 controls the fixing device 15A to set a temperature of the heater at the standby temperature in a print standby state. Then, upon start of the processing in the normal mode after executing the processing of S25 of FIG. 3 or the processing of S51, the main CPU 58 starts time measurement using the first timer 55 so as to measure an elapsed time of the normal mode (S53 of FIG. 4).

Then, the main CPU 58 executes processing of S55 and subsequent steps to execute processing corresponding to each of the above three panel display requests in the deep sleep modes. Even when determining in S100 in the sleep mode of FIG. 5 to be described later that the panel display request has been detected (S100: YES), the main CPU 58 resumes processing from S53 of FIG. 4 after executing processing of S101 of FIG. 5 and processing of subsequent steps illustrated in FIG. 6 and then executes processing of S55 and subsequent steps.

The main CPU 58 determines whether or not a print job has been received through the interface unit 49 (S55 of FIG. 4). When determining that the print job has been received (S55: YES), the main CPU 58 once clears the measured time of the first timer 55 (S57) and executes print processing corresponding to the print job (S59). Specifically, as the print processing of S59, the main CPU 58 increases the temperature of the heater of the fixing device 15A from the standby temperature to fixing temperature at which the print processing can be executed. Further, the main CPU 58 generates the display image data GD to be displayed during the print processing and transmits the generated display image data GD to the panel ASIC 61. The panel ASIC 61 changes display on the display panel of the display operation panel 41. Further, the main CPU 58 executes the received print job by the printer 15. After the printer 15 discharges the last page to the in-body sheet discharge portion 19 (see FIG. 1), the main CPU 58 executes control of setting back the heater temperature to the standby temperature.

When determining that the print job has not been received (S55: NO), the main CPU 58 determines whether or not the interruption request signal SI1 has been received from the NFC board 30 (S61). When determining that the interruption request signal SI1 has been received (S61: YES), the main CPU 58 clears the measured time of the first timer 55 (S63) and executes the NFC communication with the portable terminal U (S65). Specifically, in S65, the main CPU 58 receives a print job transmitted from the portable terminal U to the NFC board 30 through the panel ASIC 61. Then, the main CPU 58 increases the temperature of the heater of the fixing device 15A from the standby temperature to the fixing temperature and prints image data corresponding to the print job received from the portable terminal U by the printer 15. The main CPU 58 may generate the display image data GD to be displayed during the print processing and display the generated display image data GD on the display operation panel 41. When printing processing corresponding to all the print jobs has been finished or when the NFC communication with the portable terminal U has been disconnected, the main CPU 58 ends processing of S65.

When determining that the interruption request signal SI1 has not been received (S61: NO), the main CPU 58 determines whether or not an input signal SI2 (see FIG. 2) corresponding to a user's operation has been received from the display operation panel 41 (S67). When determining that the input signal SI2 has been received (S67: YES), the main CPU 58 clears the measured time of the first timer 55 (S69) and executes processing corresponding to the panel operation that the user has made to the display operation panel 41 (S71). Specifically, for example, when receiving an input signal SI2 corresponding to operation of copy print from the display operation panel 41, the main CPU 58 drives the ADF 23 (see FIG. 1) to feed documents placed on the document placing portion 25 one by one for reading and prints read image data by the printer 15.

After executing the processing of S59, S65 or S71, the main CPU 58 resumes time measurement using the first timer 55 (S73) and then determines whether or not five minutes have elapsed from resuming the time measurement by the first timer 55 (S75). Further, when determining in S67 that the input signal SI2 has not been received (S67: NO), that is, when any one of the three panel display requests has not been detected, the main CPU 58 determines whether or not five minutes have been elapsed from resuming the time measurement by the first timer 55 (S75). When determining that five minutes have not elapsed from resuming the time measurement (S75: NO), the main CPU 58 repeatedly executes the processing from S55 to maintain the normal mode.

On the other hand, when determining that five minutes have elapsed from resuming the time measurement by the first timer 55 (S75: YES), the main CPU 58 clears the measured time of the first timer 55 (S77) and transmits, to the panel ASIC 61, the control signal CD1 for putting the display panel of the display operation panel 41 into the non-display state (S79). The panel ASIC 61 turns off the backlight of the display panel of the display operation panel 41 to put the display panel in the non-display state. The display panel thus enters the non-display state and, then, the multifunction peripheral 10 enters the sleep mode (S81). Further, the main CPU 58 stops power supply to the heater of the fixing device 15A. As a result, the multifunction peripheral 10 in the sleep mode can achieve power saving. In this state, the printer 15 receives power supply of 24 V from the power supply unit 43.

Figure 5:
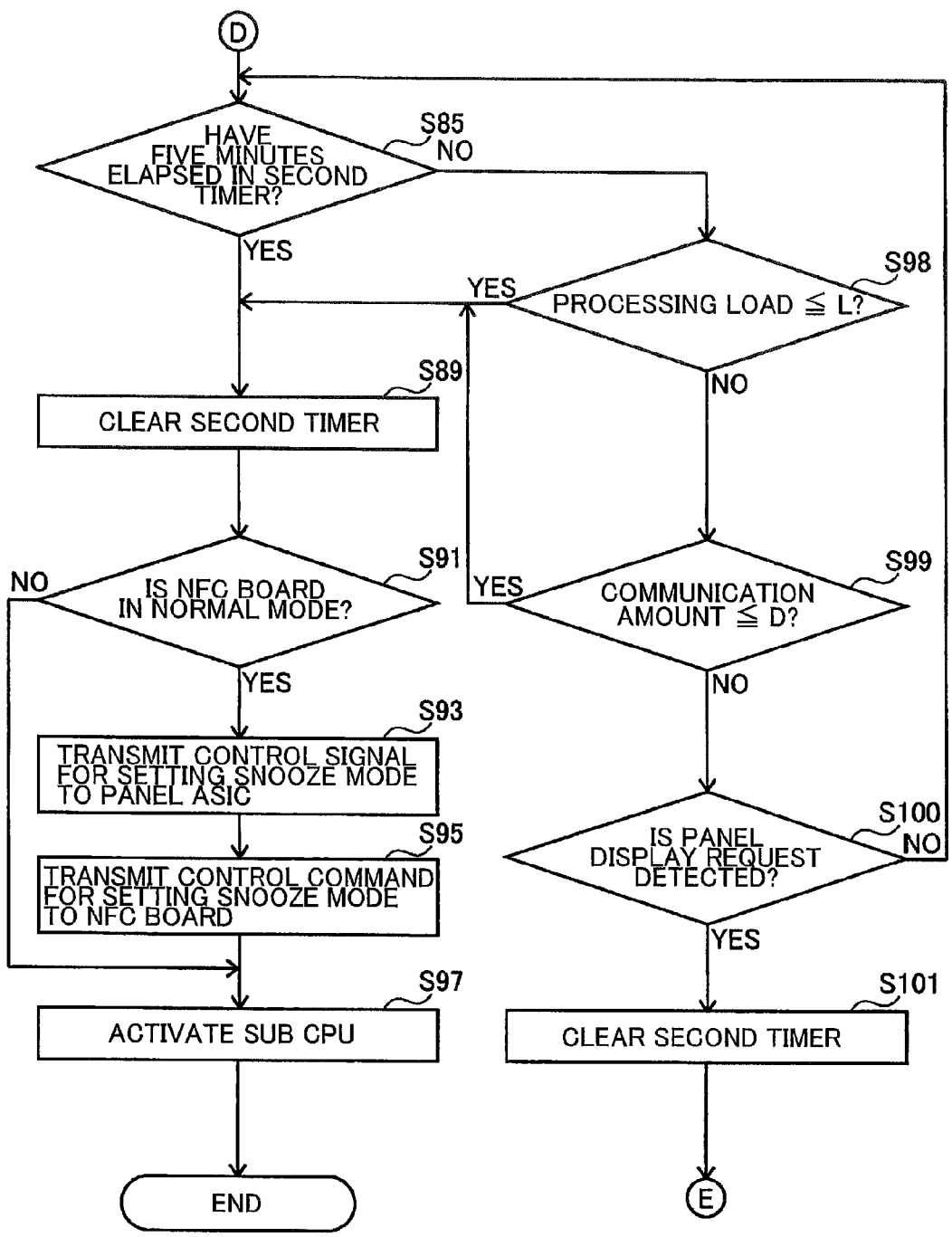
FIG. 5 is a flowchart illustrating steps in processing executed by the main CPU in the normal mode and the sleep mode.

After the multifunction peripheral 10 enters the sleep mode, the main CPU 58 starts time measurement using the second timer 56 so as to measure an elapsed time of the sleep mode (S83) and then determines whether or not five minutes have elapsed from the start of the time measurement by the second timer 56 (S85 of FIG. 5). As illustrated in FIG. 5, when determining that five minutes have elapsed from the start of the time measurement by the second timer 56 (S85: YES), it means that the user has not access the multifunction peripheral 10 during the sleep mode, so the multifunction peripheral 10 transits to the deep sleep mode for further power saving.

The main CPU 58 clears the measured time of the second timer 56 (S89) and then determines whether or not the NFC board 30 is in the normal mode (S91). When determining that the NFC board 30 is in the normal mode (S91: YES), the main CPU 58 transmits, to the panel ASIC 61, the control signal CD1 for setting the NFC board 30 to the snooze mode (S93). When receiving the control signal CD1, for example, the panel ASIC 61 changes the signal level to be sent out to the I/O terminal connected to the NFC board 30 from a low level to a high level. Further, the main CPU 58 transmits the control command CD2 to the NFC board 30 through the serial bus B3 to make the NFC board 30 transit to the snooze mode (S95).

Figure 7:
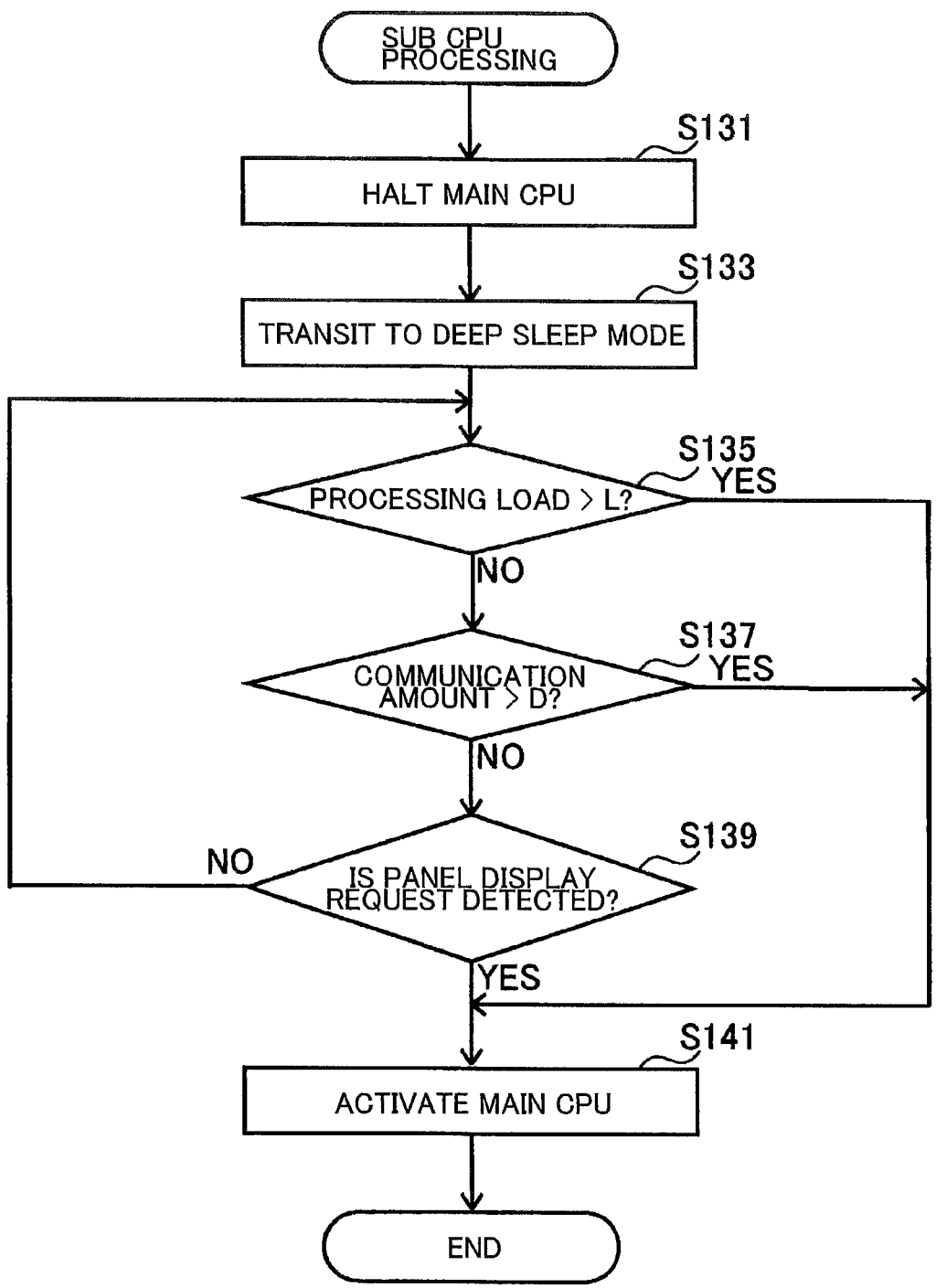
FIG. 7 is a flowchart illustrating steps in processing executed by a sub CPU in a deep sleep mode.

Further, the main CPU 58 activates the sub CPU 59 so as to switch the processing entity (S97) and executes processing of transferring necessary data to the sub CPU 59 before being halted after the multifunction peripheral 10 enters the deep sleep mode. Further, before the multifunction peripheral 10 enters the deep sleep mode, the main CPU 58 executes processing of reducing the drive voltage to be supplied from the power supply unit 43 to the printer 15 from 24 V to 6 V. Then, the activated sub CPU 59 executes processing in the deep sleep mode as illustrated in FIG. 7 to be described later. When determining in S91 that the NFC board 30 is not in the normal mode (S91: NO), the main CPU 58 executes the processing of S97.

On the other hand, when determining in S85 that five minutes have not elapsed from the start of the time measurement by the second timer 56 (S85: NO), the main CPU 58 determines a processing load thereon (S98). When determining that a value indicating the processing load is equal to or smaller than the threshold value L (S98: YES), the main CPU 58 starts executing the processing of S89 and subsequent steps to make the multifunction peripheral 10 transit to the deep sleep mode. That is, when the processing load on the main CPU 58 is small, it is less likely that the user accesses the multifunction peripheral 10, so that it is highly likely that reduction in usability can be ignorable even when the multifunction peripheral 10 is made to transit to the deep sleep mode for further power saving. The processing load mentioned here is, e.g., an occupancy ratio of the processing time of the main CPU per unit time by a program being executed in the main CPU 58. Alternatively, the processing load may be determined based on an access frequency to the memory 53, a data transfer frequency in a CPU bus connected to the main CPU 58, or the like.

Further, when determining that the processing load is greater than the threshold value L (S98: NO), the main CPU 58 determines a communication amount in the interface unit 49 (S99). When determining that the data amount to be received by the interface unit 49 per unit time is equal to or less than the predetermined amount D (S99: YES), the main CPU 58 starts executing the processing of S89 and subsequent steps to make the multifunction peripheral 10 transit to the deep sleep mode. That is, when the communication amount is small, which means that no or a little inquiry is made from an external PC through the interface unit 49, so it is less likely that the user accesses the multifunction peripheral 10, so that it is highly likely that reduction in usability can be ignorable even when the multifunction peripheral 10 is made to transit to the deep sleep mode for further power saving.

Further, when determining that the communication amount in the interface unit 49 is more than the predetermined amount D (S99: NO), the main CPU 58 then determines whether or not the panel display request has been received in the sleep mode (S100). A case where the panel display request is detected corresponds to a case where a condition under which the display panel of the display operation panel 41 is put into the display state is satisfied (for example, when a print job is received through the interface unit 49) as in the case where the panel display request is received in S27 of FIG. 3, in other words, a case where the multifunction peripheral 10 returns from the sleep mode to the normal mode. When determining that the panel display request has not been detected (S100: NO), the main CPU 58 executes processing from S85 to maintain the sleep mode.

Figure 6:
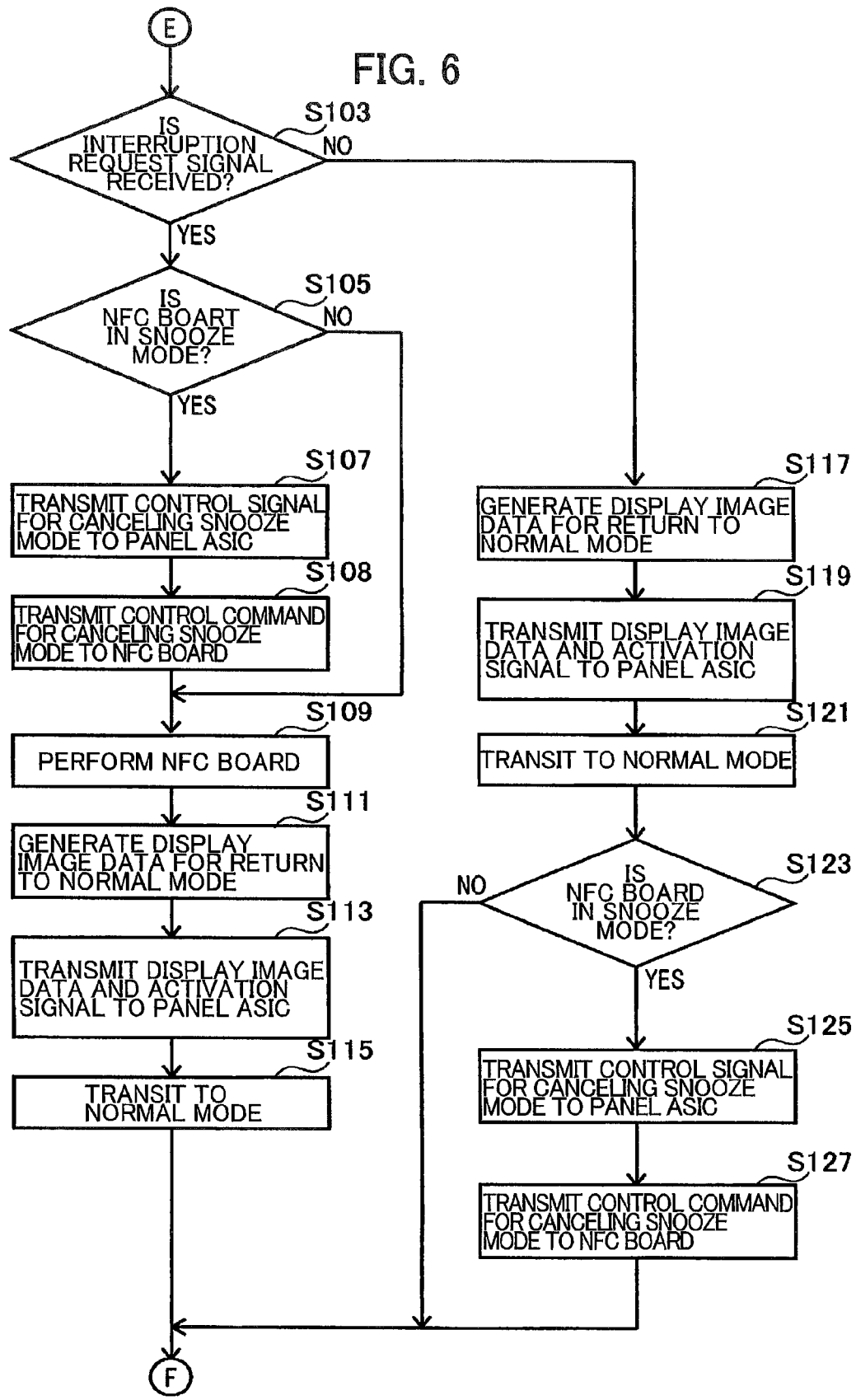
FIG. 6 is a flowchart illustrating steps in processing executed by the main CPU in the normal mode and the sleep mode.

Further, when determining that the panel display request has been detected (S100: YES), the main CPU 58 clears the measured time of the second timer 56 (S101) and executes preprocessing corresponding to the received panel display request before the multifunction peripheral 10 transits to the normal mode. When receiving the interruption request signal SD from the NFC board 30 as the panel display request, unlike a case where any one of the other two panel display requests is received, the communication processing with the portable terminal U approaching the NFC board 30 is required. Thus, as illustrated in FIG. 6, when determining that the interruption request signal SI1 has been received (S103: YES), the main CPU 58 determines whether or not the NFC board 30 is in the snooze mode (S105). When determining that the NFC board 30 is in the snooze mode (S105: YES), the main CPU 58 transmits, to the panel ASIC 61, the control signal for canceling the snooze mode of the NFC board 30 (S107). Further, the main CPU 58 transmits the control command CD2 to the NFC board 30 to make the NFC board 30 transit to the normal mode (S108).

When determining that the NFC board 30 is in the normal mode (S105: NO), or when executing S108 to make the NFC board 30 to transit to the normal mode, the main CPU performs the NFC communication between the NFC board 30 and the portable terminal U (S109). The main CPU 58 performs authentication of the portable terminal U. Then, for return to the normal mode, the main CPU 58 generates the display image data GD to be displayed on the display operation panel 41 (S111) and transmits the generated display image data GD to the panel ASIC 61 (S113). Further, the main CPU 58 transmits, to the panel ASIC 61, the activation signal (control signal CD1) for putting the display operation panel 41 into the display state (S113). The display panel thus enters the display state and, then, the multifunction peripheral 10 enters the normal mode (S115). Also in this case, as in the processing of S31 to S39, the main CPU 58 executes first the communication processing (S107, S108, and S109) for making the NFC board 30 perform the NFC communication and then the display processing (S111 and S113) for putting the display operation panel 41 into the display state. This prevents a delay from occurring in the processing such as user authentication, thereby improving usability.

On the other hand, when determining that the interruption request signal SI1 has not been received (S103: NO), the main CPU 58 executes processing of S117 and subsequent steps. The processing of S117 to S127 are processing to be performed in the sleep mode in a case where a print job is received at the interface unit 49 and where a user's operation made to the display operation panel 41 is detected. For return to the normal mode, the main CPU 58 generates the display image data GD to be displayed on the display operation panel 41 (S117) and transmits the generated display image data GD and activation signal to the panel ASIC 61 (S119). The display panel thus enters the display state and, then, the multifunction peripheral 10 enters the normal mode (S121).

Next, when determining that the NFC board 30 is in the snooze mode (S123: YES), the main CPU 58 transmits, to the panel ASIC 61, the control signal CD1 for canceling the snooze mode of the NFC board 30 (S125). At this time, the control signal CD1 for canceling the snooze mode and the control signal CD1 for displaying the display panel (S119) may conflict with each other during transmission through the serial bus B1 (see FIG. 2). Thus, when it cannot be detected that the NFC board 30 returns to the normal mode from the snooze mode, the main CPU 58 preferably transmits the control signal CD1 for canceling the snooze mode once again. The main CPU 58 transmits the control command CD2 to the NFC board 30 to make the NFC board 30 transit to the normal mode (S127). When executing the processing of S115 or S127 or when determining that the NFC board 30 is in the normal mode (S123: NO), the main CPU 58 executes the processing of S53 and subsequent steps illustrated in FIG. 4.

As in the processing of S41 to S49 illustrated in FIG. 3, the main CPU 58 executes first the display processing (S117 and S119) for making the display operation panel 41 display the display image data GD and then processing (S125 and S127) for canceling the snooze mode of the NFC board 30, allowing the user to be promptly informed that the display of the display operation panel 41 has been enabled.

The following describes transition processing to the deep sleep mode and processing performed during the deep sleep mode with reference to FIG. 7. FIG. 7 illustrates processing executed by the sub CPU 59 activated by the main CPU 58 in S97 of FIG. 5.

The sub CPU 59 is activated by the main CPU 58 and receives necessary data from the main CPU 58. Then, the sub CPU 59 executes processing of halting the main CPU 58 (S131). The main CPU 58 is thus halted and, then, the multifunction peripheral 10 enters the deep sleep mode (S133). The sub CPU 59 determines, according to the same conditions used in the processing performed by the main CPU 58, whether to maintain the deep sleep mode or activate the main CPU 58 for return to the normal mode or sleep mode.

The sub CPU 59 first determines a processing load thereon (S135). When determining that a value indicating the processing load is greater than the threshold value L (S135: YES), the sub CPU 59 activates the main CPU 58 (S141). That is, in this case, it is highly likely that the processing load is increased by the user accessing the multifunction peripheral 10 (for example, the document cover 21 of the scanner 13 is opened by the user for initialization of the reading device or that the supply tray 17 is replenished with sheets by the user). Thus, usability is preferably prioritized over power saving.

The activated main CPU 58 executes the processing of S11 and subsequent steps illustrated in FIG. 3. In this case, the main CPU 58 executes the processing of S11 to S17, and S27. In S27, the main CPU 58 does not detect the panel display request (S27: NO) and thus executes the processing of S83 and subsequent steps of FIG. 4. That is, in this case, the multifunction peripheral 10 returns from the deep sleep mode to the sleep mode. In the multifunction peripheral 10 of the present embodiment, the main ASIC 51 is made to return from the deep sleep mode to the sleep mode, while the snooze mode of the NFC board 30 is maintained.

When determining that the processing load is equal to or smaller than the threshold value L (S135: NO), the sub CPU 59 determines the communication amount in the interface unit 49 (S137). When determining that the data amount received by the interface unit 49 per unit time is more than the predetermined amount D (S137: YES), the sub CPU 59 activates the main CPU 58 (S141). For example, the increase in the communication amount may be caused when new data such as a new mail is downloaded while inquiry is made periodically from the sub CPU 59 to a server provided by a vender of the multifunction peripheral 10 through the interface unit 49. In this case, it is highly likely that the user accesses the multifunction peripheral 10 (for example, the user checks the downloaded new information). Thus, when determining that the communication amount is increased, the sub CPU 59 activates the main CPU 58 to prioritize usability over power saving. In this case, as in the case where the processing load is increased (S135: YES), the multifunction peripheral 10 returns from the deep sleep mode to the sleep mode.

When determining that the communication amount in the interface unit 49 is equal to or less than the predetermined amount D (S137: NO), the sub CPU 59 determines whether or not the panel display request has been detected (S139). A case where the panel display request is detected corresponds to, as in the case where the panel display request is detected in S27 of FIG. 3 (S27: YES), a case where a condition under which the display panel of the display operation panel 41 is put into the display state is satisfied (for example, a print job is received through the interface unit 49), in other words, a case where the multifunction peripheral 10 returns from the deep sleep mode to the normal mode. When determining that the panel display request has not been detected (S139: NO), the sub CPU 59 executes the processing from S135 to maintain the deep sleep mode.

When determining that the panel display request has been detected (S139: YES), the sub CPU 59 activates the main CPU 58 (S141). For example, the sub CPU 59 detects the panel display request by receiving a print job through the interface unit 49. Further, for example, the sub CPU 59 detects the panel display request by receiving the input signal SI2 from the display operation panel 41. Further, for example, the sub CPU 59 detects the panel display request by receiving the interruption request signal SI1 from the NFC board 30.

The activated main CPU 58 starts the processing from S11 of FIG. 3. In this case, the main CPU 58 executes the processing of S11 to S17, and S27. In S27, the main CPU 58 receives the panel display request (S27: YES), so that it executes the processing of S29 and subsequent steps. That is, in this case, the multifunction peripheral 10 returns from the deep sleep mode to the normal mode. In the multifunction peripheral 10, the multifunction peripheral 10 is made to return from the deep sleep mode to the normal mode and, at the same time, the processing of S31 and S32 or S47 and S49 are executed to make the NFC board 30 return from the snooze mode to the normal mode.

Figure 8:
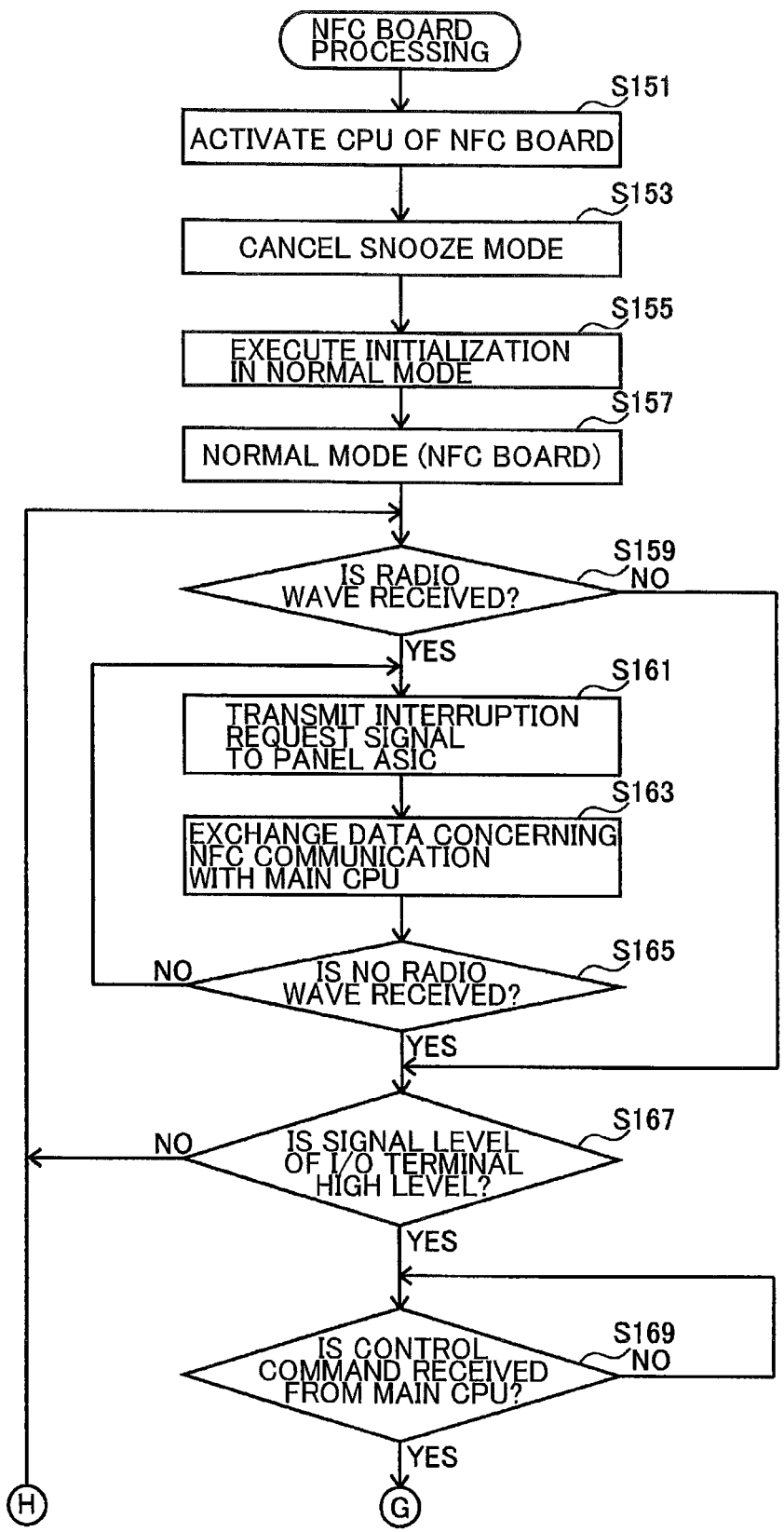
FIG. 8 is a flowchart illustrating steps in processing executed by a CPU of an NFC board in a normal mode and a snooze mode.
Figure 9:
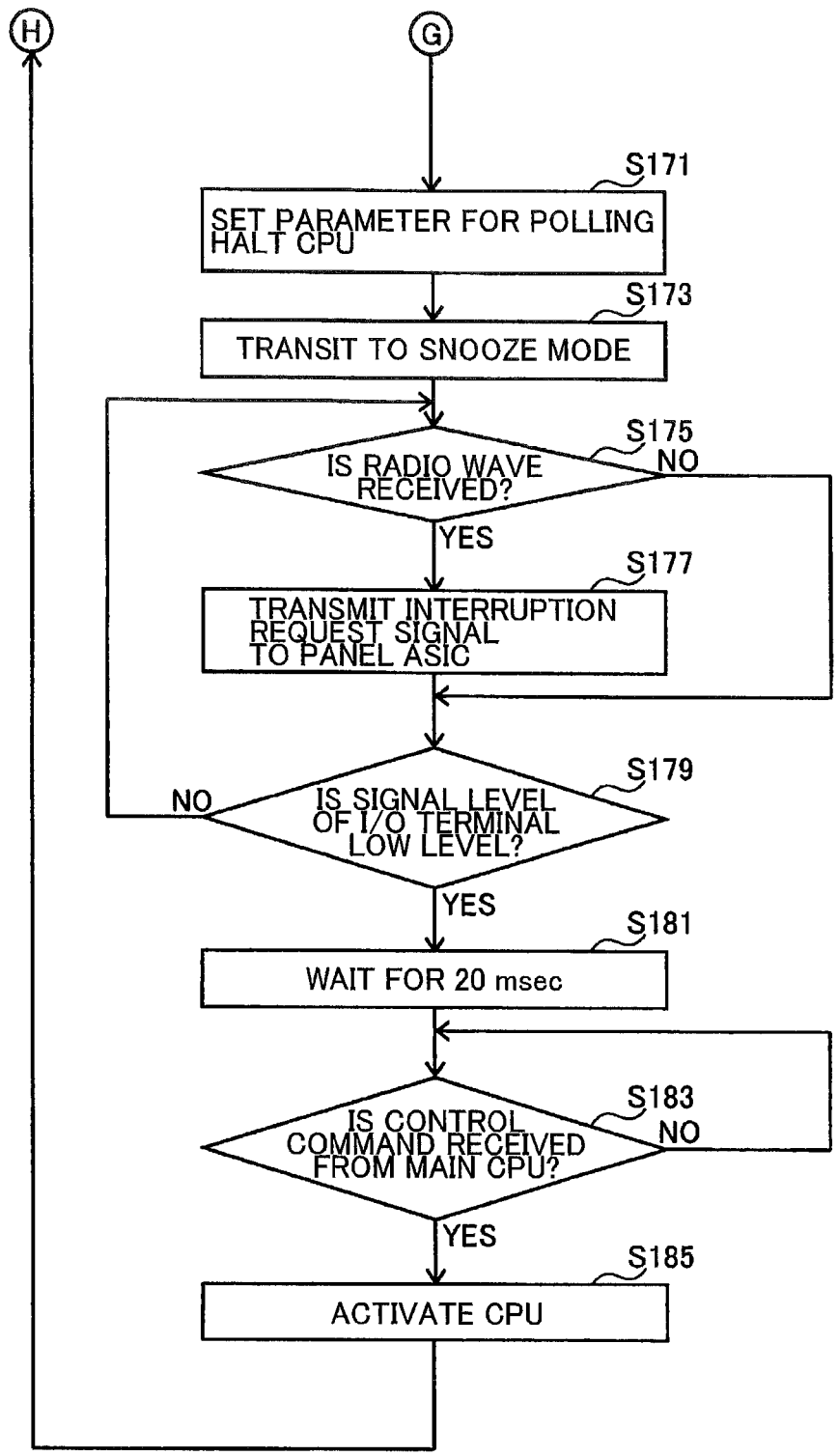
FIG. 9 is a flowchart illustrating steps in processing executed by a CPU of an NFC board in a normal mode and a snooze mode.

The following describes processing to be performed by the CPU 35 of the NFC board 30 with reference to FIGS. 8 and 9. The CPU 35 of the NFC board 30 is activated when the power switch of the multifunction peripheral 10 is ON (S151) and starts processing illustrated in FIGS. 8 and 9. When processing is started by the power-ON of the power switch as illustrated in FIG. 3, the main CPU 58 cancels the snooze mode of the NFC board 30 (S153) and initializes the CPU 35 of the NFC board 30 in the normal mode. Thus, when receiving the control command CD2 from the main CPU 58, the CPU 35 cancels the snooze mode (S153) and executes initialization in the normal mode (S155). The NFC board 30 is thus in a normal communication mode where the CPU 35 is activated (S157).

Then, in the normal communication mode, the NFC board 30 determines whether or not a response to the polling radio wave has been received (S159). That is, the NFC board 30 determines whether there is any external device such as the portable terminal U with which the NFC communication is desired to be performed near the NFC board 30. When determining that a response to the polling radio wave has been received (S159: YES), the NFC board 30 transmits the interruption request signal SI1 to the panel ASIC 61 (S161). As illustrated in S61 and subsequent steps of FIG. 4, when receiving the interruption request signal SI1 from the panel ASIC 61 in the normal communication mode, the main CPU 58 executes the NFC communication with the portable terminal U (see S65 of FIG. 4) and executes processing of receiving a print job from the portable terminal U and the like. Thus, after establishing the communication with the portable terminal U, the CPU 35 exchanges, with the main CPU 58, data concerning the NFC communication such as the print job received through the NFC communication (S163). The CPU 35 repeatedly executes the processing of S161 and S163 until it has received no radio wave from the portable terminal U (S165: NO) responding to the polling radio wave.

When determining that a response to the polling radio wave has not been received (S159: NO or S165: YES), the CPU 35 determines whether or not the signal level to be input from the I/O terminal connected to the panel ASIC 61 has been changed from a low level to a high level (S167). When determining that a change in the signal level has not been detected, that is, when the signal level is maintained at a low level (S167: NO), the CPU 35 executes the processing from S159 to maintain the normal mode.

When determining that the signal level has been changed to a high level (S167: YES), the CPU 35 determines whether or not the control command CD2 has been received from the main CPU 58 through the serial bus B3 (S169). As described above, the NFC board 30 of the present embodiment is configured not to transit to the snooze mode until the signal level to be input from the I/O terminal is changed. In addition, the NFC board 30 is configured not to transit to the snooze mode until it has received the control command CD2 from the main CPU 58 through the serial bus B3. Thus, the CPU 35 does not make the NFC board 30 transit to the snooze mode until it has received the control command CD2 transmitted, in S95 of FIG. 5, from the main CPU 58 (S169: NO).

On the other hand, when determining that the control command CD2 has been received from the main CPU 58 (S169: YES), the CPU 35 sets, in the communication circuit 33, a parameter for polling to be executed during the snooze mode and then executes processing of halting the CPU 35 itself (S171). The CPU 35 sets a parameter to reduce intensity of radio waves to be transmitted during the snooze mode from the loop antenna 31. In the NFC board 30, although the CPU 35 is halted, the polling radio wave is transmitted from the loop antenna 31. The NFC board 30 is thus made to transit to the snooze mode where the CPU 35 is halted and the intensity of the radio waves is reduced for power saving (S173).

In the snooze mode, the NFC board 30 determines whether or not a response to the polling radio wave having reduced intensity has been received (S175). When determining that a response to the polling radio wave has been received (S175: YES), the NFC board 30 transmits the interruption request signal SI1 to the panel ASIC 61 (S177). The panel ASIC 61 transfers the received interruption request signal SI1 to the main ASIC 51. When determining that a response to the polling radio wave has not been received (S175: NO) or when transmitting the interruption request signal SI1 (S177), the NFC board 30 determines whether or not the signal level to be input from the I/O terminal connected to the panel ASIC 61 has been changed from a high level to a low level (S179). When determining that a change in the signal level has not been detected, that is, when the signal level is maintained at a high level (S179: NO), the CPU 35 executes the processing from S175 to maintain the snooze mode.

When determining that the signal level has been changed to a low level (S179: YES), the NFC board 30 executes processing of waiting for a predetermined time (S181). For example, the NFC board 30 is configured not to receive the control command CD2 transmitted through the serial bus B3 for 20 msec after the signal level has been changed to a low level. Thus, the NFC board 30 executes the processing of waiting for 20 msec in S181 and then determines whether or not the control command CD2 has been received from the main CPU 58 (S183). The NFC board 30 does not return to the normal mode until it has received the control command transmitted from the main CPU 58 (S183: NO).

When determining that the control command CD2 has been received from the main CPU 58 (S183: YES), the NFC board 30 activates the CPU 35 (S185) to return to the normal mode and then executes the processing from S159 once again.

The multifunction peripheral 10 is an example of an image forming apparatus. The NFC board 30 is an example of a communication device. The display operation panel 41 is an example of a display device and an input device. The controller 45 is an example of a controller and a first controller. The panel board 46 is an example of a controller and a second controller. The interface unit 49 is an example of a communication interface. The main CPU 58 is an example of a first processing circuit. The sub CPU 59 is an example of a second processing circuit. The portable terminal U is an example of a portable device. The interruption request signal SI1 is an example of an approach detection signal. The control signal CD1 and the control command CD2 are each an example of a sleep mode cancellation signal.

According to the above-described embodiment, the following effects can be obtained.

<Effect 1>

Figure 10:
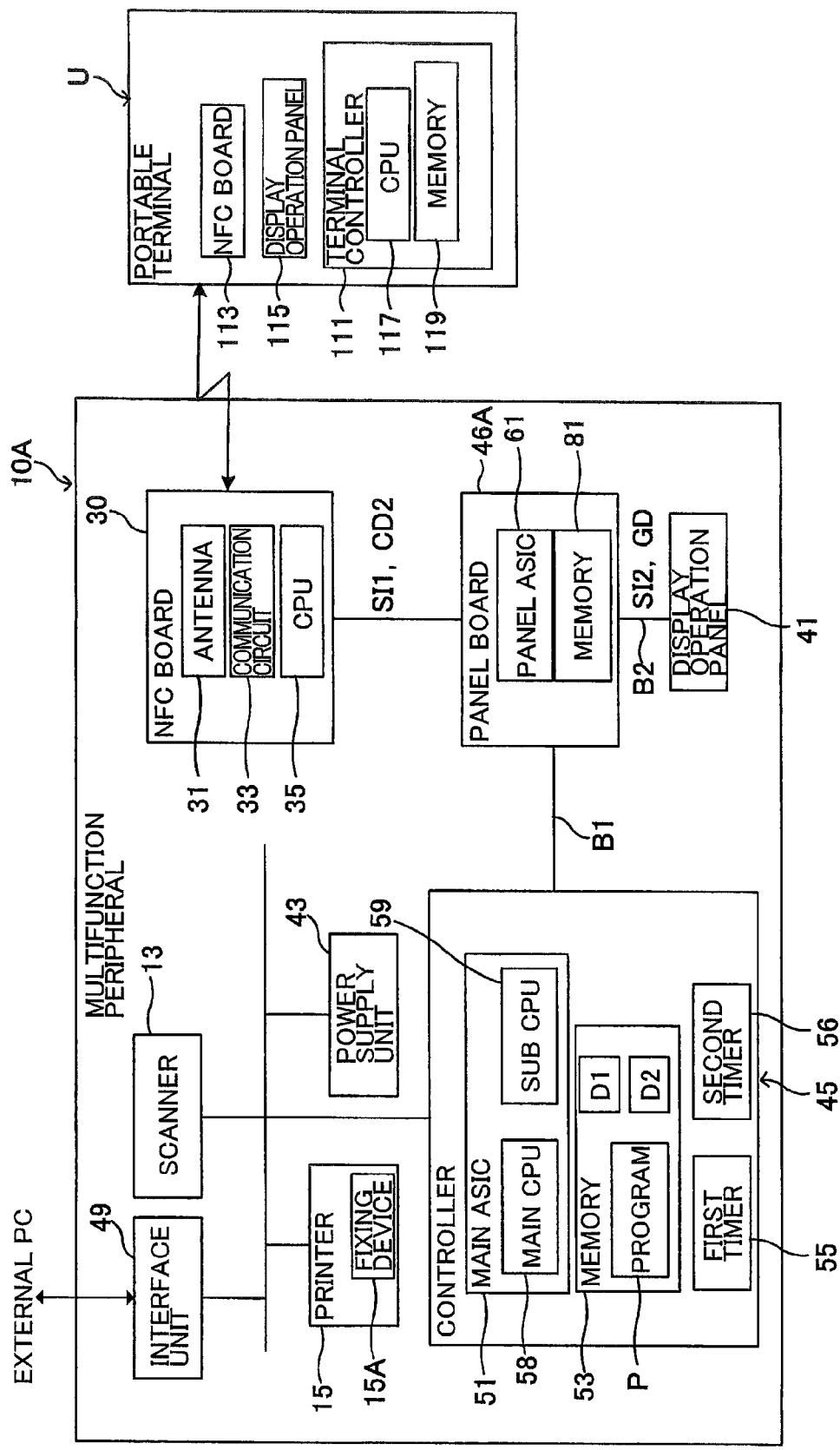
FIG. 10 is a block diagram illustrating an electrical configuration of a multifunction peripheral of a first comparative example and that of a portable terminal.

Prior to explaining the effects of the above-described embodiment, first, a configuration of a multifunction peripheral 10A of a first comparative example illustrated in FIG. 10 will be described. In the following description, the similar parts and components are designated by the same reference numerals to avoid duplicating description. Unlike the multifunction peripheral 10 of the above embodiment, the multifunction peripheral 10A of the first comparative example illustrated in FIG. 10 has a configuration in which a panel board 46A is provided with a memory 81. The panel ASIC 61 of the panel board 46A uses the memory 81 (RAM, ROM, etc.) to generate the display image data GD or control command CD2. Further, like the panel board 46 of the above embodiment, the panel board 46A changes the signal level to be sent out to the I/O terminal connected to the NFC board 30. Thus, the panel board 46A executes all the processing related to the NFC board 30 and the display operation panel 41 which are executed by the main ASIC 51 in the above embodiment. Therefore, the main ASIC 51 of this first comparative example only performs confirmation of processing completion based on a completion notification received from the panel board 46A.

In such configured multifunction peripheral 10A, the panel board 46A mainly executes control for the NFC board 30 and the display operation panel 41, so that a data amount of the control information to be transmitted through the serial bus B1 connecting the controller 45 and the panel board 46 can be reduced more than in the multifunction peripheral 10 of the above embodiment. Further, as compared to a case where the main ASIC 51 exchanges the interruption request signal SI1 with the NFC board 30 through the panel board 46 in the above embodiment, a response to the inquiry from the CPU 35 of the NFC board 30 can be quickened to reduce processing time required for the control. However, making the panel board 46A more sophisticated leads to an increase in production cost; while unless a certain level of throughput can be ensured, it takes time to generate the display image data GD. That is, a delay occurs in display processing of the display image data GD on the display operation panel 41.

Figure 11:
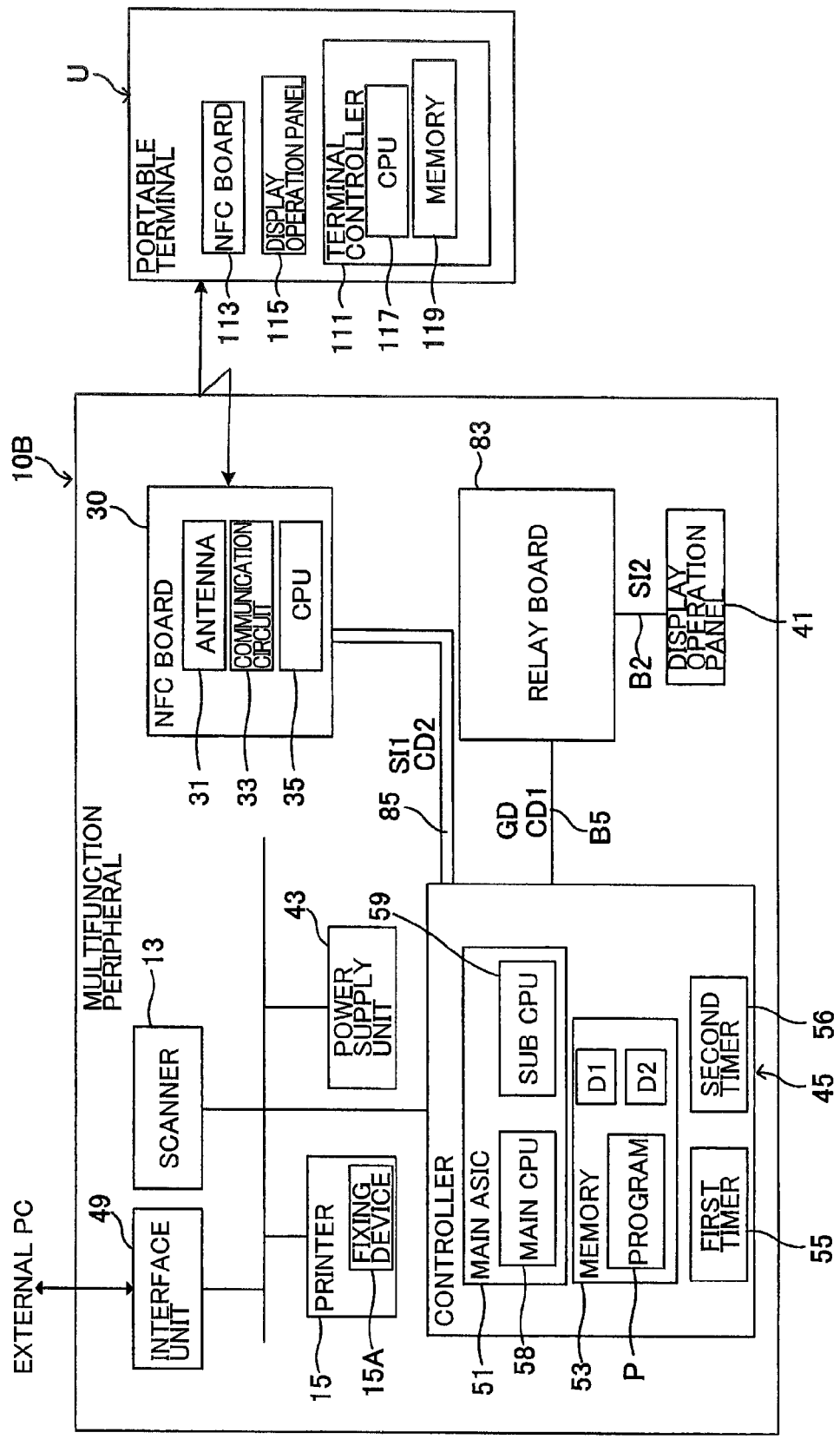
FIG. 11 is a block diagram illustrating an electrical configuration of a multifunction peripheral of a second comparative example and that of a portable terminal.

Next, a configuration of a multifunction peripheral 10B of a second comparative example illustrated in FIG. 11 will be described. The multifunction peripheral 10B of the second comparative example illustrated in FIG. 11 has, in place of the panel board 46 of the above embodiment, a relay board 83 connected to the parallel bus B2. The main ASIC 51 is connected to the relay board 83 through a parallel bus B5. The main ASIC 51 transmits, to the display operation panel 41, the display image data GD and the control signal CD1 through the parallel buses B2 and B5 and the relay board 83. The controller 45 is connected to the NFC board 30 through a harness 85. The harness 85 includes a signal line for exchanging the control command CD2 and the interruption request signal SI1 in the above embodiment and a signal line connected to the I/O terminal of the NFC board 30. Thus, the controller 45 of the multifunction peripheral 10B is connected to the NFC board 30 and the display operation panel 41 (relay board 83) through independent communication paths.

Such configured multifunction peripheral 10B performs image processing for the display image data GD using the main ASIC 51 with sophisticated functions, so that time taken for image processing can be shortened. Further, the panel board 46 can be omitted, so that production cost can be reduced. On the other hand, the controller 45 is connected to both the NFC board 30 and the relay board 83, which may increase the interface size. Further, the parallel bus B5 is used in place of the serial bus B1 of the above embodiment; however, a clock deviation occurs easier in parallel transfer than in serial transfer, so that when a transmission distance is increased, a transmission rate of the display image data is hard to increase, thereby being easily subject to external noise.

On the other hand, in multifunction peripheral 10 of the present embodiment, the panel ASIC 61 of the panel board 46 need not perform image processing for the display image data GD, so that the memory 81 provided in the panel board 46A or the first comparative example may be omitted, thereby reducing production cost. Further, since the panel board 46 is provided with the panel ASIC 61, the display image data GD can be transmitted at high speed and with low noise by communication conforming to the LVDS standards by connecting the controller 45 and the panel board 46 through the serial bus B1. On the other hand, since both the NFC board 30 and the display operation panel 41 which are connected to the panel board 46 is controlled by the controller 45, an amount of data exchanged between the controller 45 and the panel board 46 may be increased. As a result, a delay may occur in the control of changing the mode of the NFC board 30 or control of switching the display state/non-display state of the display operation panel 41.

Thus, in the multifunction peripheral 10 of the above embodiment, when a condition under which the operation mode returns the deep sleep mode (example of a controller side second sleep mode) to sleep mode (example of controller side first sleep mode) is satisfied (S27: NO in FIG. 3), the snooze mode (example of a communication device side sleep mode) of the NFC board 30 is maintained. The multifunction peripheral 10 is less likely to be accessed by the user in the deep sleep mode and the sleep mode than in the normal mode, and the NFC communication is also unlikely to be used. Thus, the snooze mode of the NFC board 30 is maintained while the operation mode is switched between the deep sleep mode and the sleep mode. Then, in response to return of the multifunction peripheral 10 to the normal mode, the main CPU 58 makes the NFC board 30 return to the normal mode (S31 of FIG. 3). As described above, the multifunction peripheral 10 optimizes a condition under which the NFC board 30 returns to the normal mode while taking advantage of high speed transmission of the display image data GD or noise reduction to thereby prevent a delay caused in association with the mode change of the NFC board 30. Further, the transition to or maintenance of the power saving mode is executed according to the actual state of utilization of the user, thereby allowing priority between power saving and usability to be appropriately switched.

<Effect 2>

The NFC board 30 is made to transit to the snooze mode in response to the transition of the operation mode of the multifunction peripheral 10 from the sleep mode to the deep sleep mode (S93 and S95 of FIG. 5). Thus, in the multifunction peripheral 10, power saving can be achieved while suppressing influence on usability.

<Effect 3>

When a communication amount at the interface unit 49 is equal to or less than the predetermined amount D (S99: YES of FIG. 5), the main CPU 58 starts the transition processing (S89 and subsequent steps) to the deep sleep mode. Since it is considered that the multifunction peripheral 10 is unlikely to be accessed by the user (for example, no print job is received) when the communication amount at the interface unit 49 is small, so that the main CPU 58 changes the mode according to the communication amount to thereby achieve power saving while suppressing influence on usability.

<Effect 4>

When a value indicating the processing load is equal to or smaller than the threshold value L (S98: YES of FIG. 5), the main CPU 58 starts the transition processing (S89 and subsequent steps) to the deep sleep mode. Since it is considered that the multifunction peripheral 10 is unlikely to be accessed by the user when the processing load on the main CPU 58 is reduced, so that the main CPU 58 changes the mode according to the processing load to thereby achieve power saving while suppressing influence on usability.

<Effect 5>

The main ASIC 51 is provided with the main CPU 58 and the sub CPU 59 having different power consumptions. The main CPU 58 activates the sub CPU 59 before making the multifunction peripheral 10 transit to the deep sleep mode (S97 of FIG. 5). The activated sub CPU 59 halts the main CPU 58 (S133 of FIG. 7) and makes the multifunction peripheral 10 transit to the deep sleep mode. In the deep sleep mode where the processing load is reduced, the processing is executed by the sub CPU 59 with less power consumption, whereby power saving can be achieved.

<Effect 6>

The main CPU 58 puts the display operation panel 41 into the non-display state when making the multifunction peripheral 10 transit from the normal mode to the sleep mode (S79 of FIG. 4). On the other hand, the main CPU 58 does not execute the mode change for the NFC board 30. This prevents the processing of putting the display operation panel 41 into the non-display state and mode change processing for the NFC board 30 from conflicting with each other.

<Effect 7>

The main ASIC 51 (main CPU 58 and sub CPU 59) makes the multifunction peripheral 10 return to the normal mode (S45 of FIG. 3) when detecting that the panel display request by detecting that the input signal SI2 has been input from the display operation panel 41 (S27: YES of FIG. 3, S139: YES of FIG. 7). Accordingly, the main CPU 58 executes the processing of S47 and S49 to make the NFC board 30 return to the normal mode. Thus, by activating the NFC board 30 in the normal mode during a time after the user operates the display operation panel 41 and before he or she uses the portable terminal U to perform authentication through the NFC communication, time required for the authentication is shortened to thereby improve usability.

<Effect 8>

When receiving a print job or detecting a panel operation, the main CPU 58 executes first the display processing to make the display operation panel 41 display the display image data GD (S41 and S43 of FIG. 3) and then the processing of canceling the snooze mode of the NFC board 30 (S47 and S49). That is, the main CPU 58 executes the display processing in priority to the snooze mode cancellation processing. As a result, for example, when a user's operation is made to the display operation panel 41 in the deep sleep mode, a delay from occurring in the display processing due to execution of the processing of making the NFC board 30 return to the normal mode is prevented. This allows the user to be promptly informed that the display of the display operation panel 41 has been enabled.

<Effect 9>

When detecting the panel display request by detecting that the interruption request signal SI1 has been input from the NFC board 30 (S27: YES of FIG. 3, S139: YES of FIG. 7), the main ASIC 51 makes the multifunction peripheral 10 return to the normal mode (S45 of FIG. 3). Accordingly, the main CPU 58 executes the processing of S47 and S49 to make the NFC board 30 return to the normal mode. Thus, by making the NFC board 30 return to the normal mode in response to approach of the portable terminal U toward the NFC board 30, time required for authentication through the NFC communication is shortened to thereby improve usability.

<Effect 10>

When receiving the interruption request signal SI1 (S29: YES of FIG. 3), the main CPU 58 executes first the processing of making the NFC board 30 execute the NFC communication (S31, S32, and S33) and then the display processing of making the display operation panel 41 display the display image data GD (S35 and S37). That is, the main CPU 58 executes the communication processing in priority to the display processing. This is because the communication processing includes the NFC communication and user authentication and thus imposes a larger processing load than the display processing, which may result in longer processing time. Thus, the main CPU 58 preferentially executes the communication processing to prevent a delay from occurring in processing such as the user authentication, thereby improving usability.

While the description has been made in detail with reference to specific embodiment thereof, it would be apparent to those skilled in the art that various changes and modifications may be made therein without departing from the spirit and scope of the above described embodiment.

For example, the mode setting contents and the number of modes in each of the multifunction peripheral 10 and the NFC board 30 are illustrative only, and the multifunction peripheral 10 may have an off mode that stops a part of the functions of the power supply unit 43, in addition to the above three modes.

Further, in the above embodiment, the NFC board 30 is made to transit to the snooze mode when the multifunction peripheral 10 transmits from the sleep mode to the deep sleep mode; however, the present invention is not limited to this, but the NFC board 30 may be made to transit to the snooze mode when the multifunction peripheral 10 transits from the normal mode to the deep sleep mode.

Further, in the above embodiment, the main CPU 58 and the CPU 35 need not perform determination based on the communication amount at the interface unit 49 and the processing load.

Further, in the above embodiment, the display operation panel 41 is put into the non-display state in both the deep sleep mode and the sleep mode; however, the display operation panel 41 may be put into the display state in at least one of the sleep modes.

Further, in the above embodiment, the first time and the second time as the conditions under which the multifunction peripheral 10 transits from the normal mode to the sleep mode are both set to the same (five minutes in S75 of FIG. 4); however, the present invention is not limited to this, but the first and second times may be set to different times. That is, the first time for determining the time during which the input signal SI2 is not received may be set to, e.g., five minutes, and the second time for determining the time during which the interruption request signal SI1 is not received may be set to, e.g., seven minutes.

Further, in the above embodiment, the control by using the control command CD2 need not be performed. That is, the mode of the NFC board 30 may be changed only by using the control by the control signal CD1.

Further, in the above embodiment, the panel ASIC 61 changes the signal level to be sent to the I/O terminal connected to the NFC board 30 upon receiving the control signal CD1 for canceling the snooze mode; however, the present invention is not limited to this, but the panel ASIC 61 may simply transfer the control signal CD1 to the NFC board 30.

Further, in the above embodiment, the NFC board 30 needs not reduce the intensity of the radio waves to be used as the polling in the snooze mode. Further, in the above embodiment, the NFC board 30 may increase a polling period in the snooze mode.

Further, the main ASIC 51 may be provided with only the main CPU 58. In this case, the processing in the deep sleep mode may be executed by the main CPU 58.

Further, the wireless communication performed by the communication device in the present disclosure may be not only the NFC communication, but also Bluetooth® (Bluetooth is a registered trademark) communication and Wi-Fi® (Wi-Fi is a registered trademark) communication, and may be not only the near field wireless communication, but also wireless communication other than the near field wireless communication.

What is claimed is:

1. An image forming apparatus comprising:
a communication device configured to perform wireless communication, the communication device being selectively operable in a communication device normal mode and a communication device sleep mode in which the communication device consumes less power than the communication device normal mode; and
a controller selectively operable to supply power to one or more image processing devices of the image forming apparatus in a controller normal mode; a controller first sleep mode in which the one or more image processing devices consume less power than the controller normal mode, and a controller second sleep mode in which the one or more image processing devices consume less power than the controller first sleep mode, the controller being configured to:
transmit to the communication device a first command produced in response to transition to the controller second sleep mode, the first command instructing the communication device to transit to the communication device sleep mode;
maintain the communication device sleep mode regardless of return from the controller second sleep mode to the controller first sleep mode; and
transmit to the communication device a second command produced in response to return to the controller normal mode, the second command instructing the communication device to return from the communication device sleep mode to the communication device normal mode,
wherein the controller comprises a first controller and a second controller;
wherein the communication device is configured to:
detect an approach of a portable device when the communication device is in the communication device sleep mode; and
transmit an approach detection signal to the second controller in response to detecting the approach of the portable device;
wherein the second controller is configured to:
notify the first controller of receipt of the approach detection signal from the communication device;
wherein the first controller is configured to:
transmit to the second controller a sleep mode cancellation signal for return from the communication device sleep mode to the communication device normal mode in response to receipt of the approach detection signal; and wherein the second controller is configured to:

notify the communication device of receipt of the sleep mode cancellation signal from the first controller.

2. The image forming apparatus according to claim 1, wherein the first command is produced in response to transition from the controller first sleep mode to the controller second sleep mode.

3. The image forming apparatus according to claim 2, further comprising a communication interface configured to perform a communication with an external device, wherein the controller is further configured to:

transit from the controller first sleep mode to the controller second sleep mode when a communication amount in the communication interface is less than a predetermined amount; and return from the controller second sleep mode to the controller first sleep mode when the communication amount in the communication interface exceeds the predetermined amount.

4. The image forming apparatus according to claim 2, wherein the controller is further configured to:

transit from the controller first sleep mode to the controller second sleep mode when a processing load imposed upon the controller is smaller than a threshold value; and return from the controller second sleep mode to the controller first sleep mode when the processing load is greater than the threshold value.

5. The image forming apparatus according to claim 2, wherein the controller comprises a first processing circuit and a second processing circuit consuming less power than the first processing circuit; and wherein the controller is configured to transit from the controller first sleep mode to the controller second sleep mode by disabling the first processing circuit and enabling the second processing circuit.

6. The image forming apparatus according to claim 1, further comprising a display device, wherein the controller is further configured to:

put the display device in a display state when the controller is in the controller normal mode; and put the display device in a non-display state when a condition for transition from the controller normal mode to the controller first sleep mode is satisfied.

7. The image forming apparatus according to claim 1, further comprising an input device configured to generate an input signal corresponding to a user's manipulation made on the input device, wherein the controller is further configured to:

return to the controller normal mode in response to the input signal fed from the input device; and transit from the controller normal mode to the controller first sleep mode when an input signal has not been fed from the input device during a predetermined period of time.

8. The image forming apparatus according to claim 7, further comprising a display device, wherein the controller is further configured to:

put the display device in a display state when the controller is in the controller normal mode;

put the display device in a non-display state when a condition for transition from the controller normal mode to the controller first sleep mode is satisfied; and return to the controller normal mode after putting the display device in the display state.

9. The image forming apparatus according to claim 1, wherein the communication device is configured to:

detect an approach of a portable device when the communication device is in the communication device sleep mode; and transmit an approach detection signal to the controller in response to detecting the approach of the portable device; and wherein the controller is further configured to:

return to the controller normal mode in response to receipt of the approach detection signal; and transit from the controller normal mode to the controller first sleep mode when an approach detection signal has not been received for a predetermined period of time.

10. The image forming apparatus according to claim 9, further comprising a display device, wherein the controller is further configured to:

put the display device in a display state when the controller is in the controller normal mode;

put the display device in a non-display state when a condition for transition from the controller normal mode to the controller first sleep mode is satisfied; and put the display device in the display state after the communication device returns from the communication device sleep mode to the communication device normal mode in response to return to the controller normal mode.

11. The image forming apparatus according to claim 1, further comprising a display device, wherein the first controller has a memory and configured to perform image processing for an image to be displayed on the display device while storing data used for the image processing in the memory; and wherein the second controller is connected with the display device, the first controller, and the communication device and is configured to receive image data processed by the first controller and transmit the image data to the display device.

12. The image forming apparatus according to claim 1, wherein the communication device is configured to perform near field wireless communication.

* * * * *